(12) United States Patent
Lai

(10) Patent No.: US 10,925,297 B2
(45) Date of Patent: Feb. 23, 2021

(54) ICE CREAM ROLL MAKER

(71) Applicant: Kin Man Lai, Hong Kong (CN)

(72) Inventor: Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 272 days.

(21) Appl. No.: 15/270,054

(22) Filed: Sep. 20, 2016

(65) Prior Publication Data

US 2018/0077949 A1   Mar. 22, 2018

(51) Int. Cl.
*A23G 9/00* (2006.01)
*A23G 9/24* (2006.01)
*A23G 9/44* (2006.01)
*A23G 9/18* (2006.01)
*A23G 9/22* (2006.01)

(52) U.S. Cl.
CPC .............. *A23G 9/245* (2013.01); *A23G 9/18* (2013.01); *A23G 9/224* (2013.01); *A23G 9/228* (2013.01); *A23G 9/44* (2013.01)

(58) Field of Classification Search
CPC .......... A23G 9/245; A23G 9/18; A23G 9/086; A23G 9/224; A23G 9/14; A23G 9/222; A23G 9/228; A23G 9/44; F25C 1/10
See application file for complete search history.

(56) References Cited

U.S. PATENT DOCUMENTS

| | | | | |
|---|---|---|---|---|
| 4,098,095 A * | 7/1978 | Roth | ......................... | A22B 5/00 165/94 |
| 6,119,470 A * | 9/2000 | Chiang | ................... | A23G 9/12 62/129 |
| 6,176,090 B1 * | 1/2001 | Ufema | .................... | A23G 9/225 366/144 |
| 6,637,214 B1 * | 10/2003 | Leitzke | ................... | A23G 9/163 62/342 |
| 9,326,531 B1 * | 5/2016 | Reich | ....................... | A23G 9/28 |
| 9,993,015 B2 * | 6/2018 | Geng | ...................... | A23G 9/224 |

* cited by examiner

*Primary Examiner* — Henry T Crenshaw
*Assistant Examiner* — Kamran Tavakoldavani
(74) *Attorney, Agent, or Firm* — Grogan, Tuccillo & Vanderleeden, LLP

(57) ABSTRACT

An ice cream roll maker includes a housing, a freezer wheel mounted within the housing and configured for rotation about a horizontal axis, and a reservoir within the housing for holding a liquid ingredient. An outer peripheral surface of the freezer wheel is configured to receive the liquid ingredient from the reservoir and transform the liquid ingredient into a frozen coating layer on the outer peripheral surface.

11 Claims, 26 Drawing Sheets

ICE CREAM ROLL MAKER

FIELD OF THE INVENTION

The present invention relates to household appliances and, more particularly, to an appliance for making ice cream rolls.

BACKGROUND OF THE INVENTION

Household appliances for making ice cream and other frozen desserts such as sorbet, gelato frozen yogurt and the like are well know. Existing ice cream making appliances typically include a receptacle positioned inside a cooling chamber. Desired ingredients are poured into the receptacle, which is cooled by the cooling chamber from the outside. The ingredients are mixed by either a motorized or manual driven whisk or paddle mounted axially within the receptacle. This stirring or mixing action brings the liquid ingredients into contact with the cooled walls of the receptacle, freezing the ingredients to create the desired ice cream, sorbet, gelato or the like.

While existing ice cream making appliances are generally suitable for what is regarded as ordinary performance, there is still room for improvement. In particular, existing ice cream making appliances may be rather tedious to operate, and may require manual removal of the mixing paddle and/or drive shaft from the receptacle, and removal of the receptacle from the cooling chamber in order to access the ice cream. Moreover, existing appliances are typically limited in the form of ice cream produced, and are not capable of producing ice cream in various shapes and configurations.

In view of the above, there is a need for an ice cream making appliance that is user-friendly and is capable of making ice cream and other frozen desserts having various forms.

SUMMARY OF THE INVENTION

It is an object of the present invention to provide an ice cream making appliance.

It is another object of the present invention to provide an ice cream making appliance in the form of an ice cream roll maker.

It is another object of the present invention to provide an ice cream roll maker which can produce ice cream and other frozen desserts continuously.

It is another objet of the present invention to provide an ice cream roll maker that can produce ice cream rolls with different thicknesses.

It is another object of the present invention to provide an ice cream roll maker that can produce ice cream rolls with different diameters.

It is another object of the present invention to provide an ice cream roll maker for producing ice cream and other frozen desserts of various forms.

These and other objects are achieved by the present invention.

According to an embodiment of the present invention, an ice cream roll maker includes a housing, a freezer wheel mounted within the housing and configured for rotation about a horizontal axis, and a reservoir within the housing for holding a liquid ingredient. An outer peripheral surface of the freezer wheel is configured to receive the liquid ingredient from the reservoir and transform the liquid ingredient into a frozen coating layer on the outer peripheral surface. A scraping device having a leading edge is movable into association with the peripheral surface of the freezer wheel for scraping the frozen coating layer from the outer peripheral surface of the freezer wheel and for forming the frozen coating layer into a roll upon rotation of the freezer wheel.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
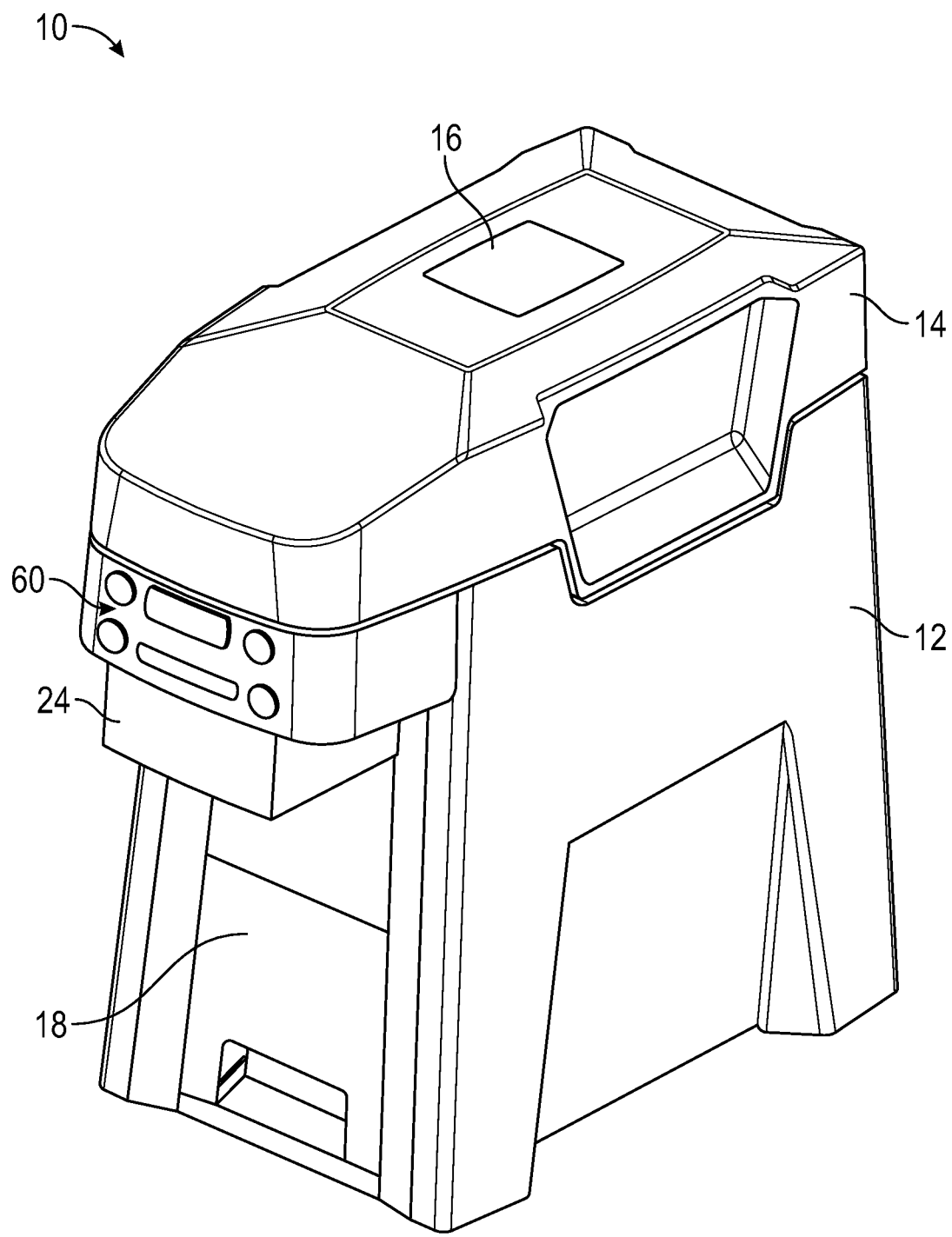
FIG. 1 is a perspective view of an ice cream roll maker, according to an embodiment of the present invention.
Figure 2:
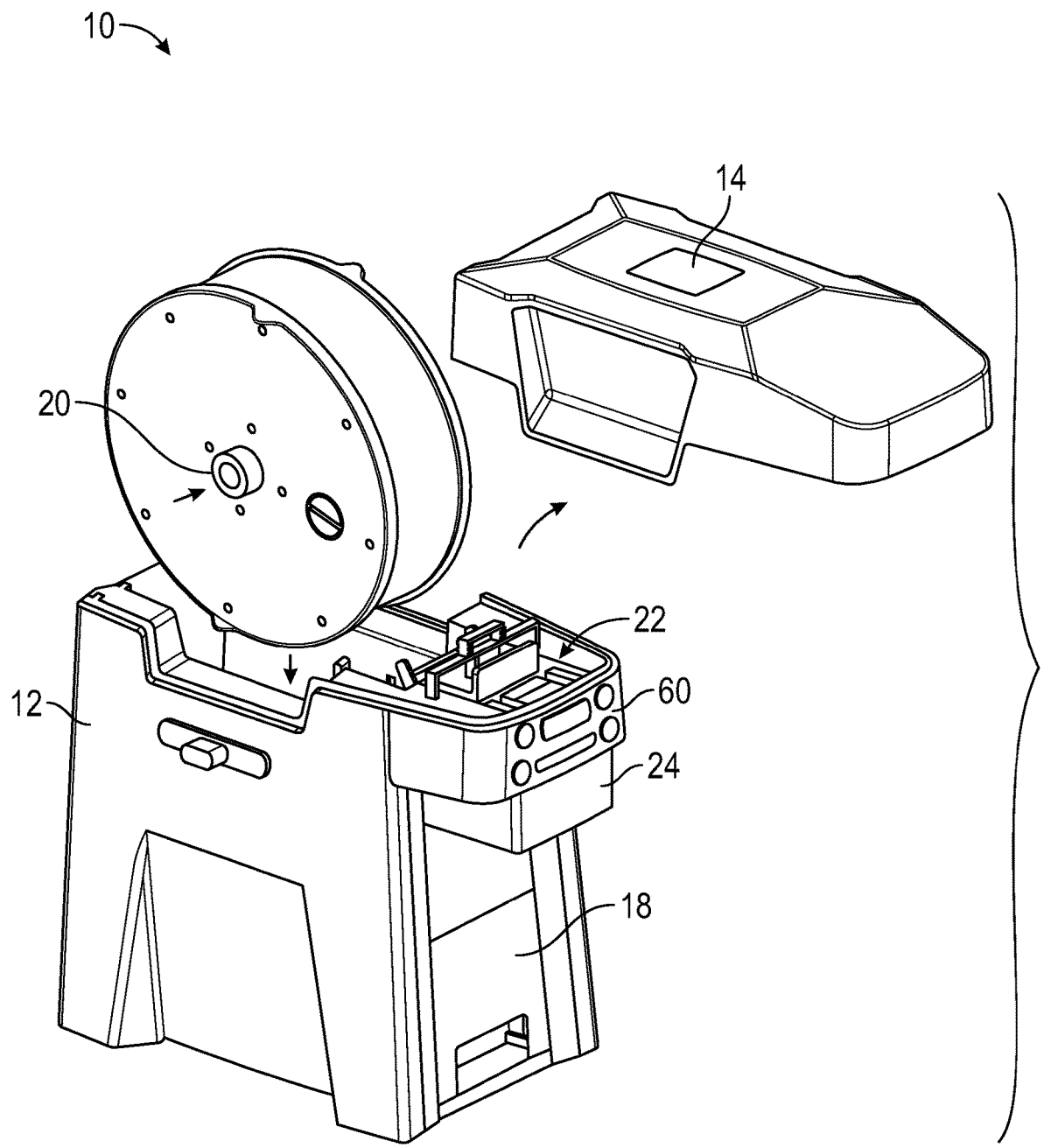
FIG. 2 is a perspective view of the ice cream roll maker of FIG. 1, shown with a cover removed and illustrating the insertion of a freezer wheel.
Figure 3:
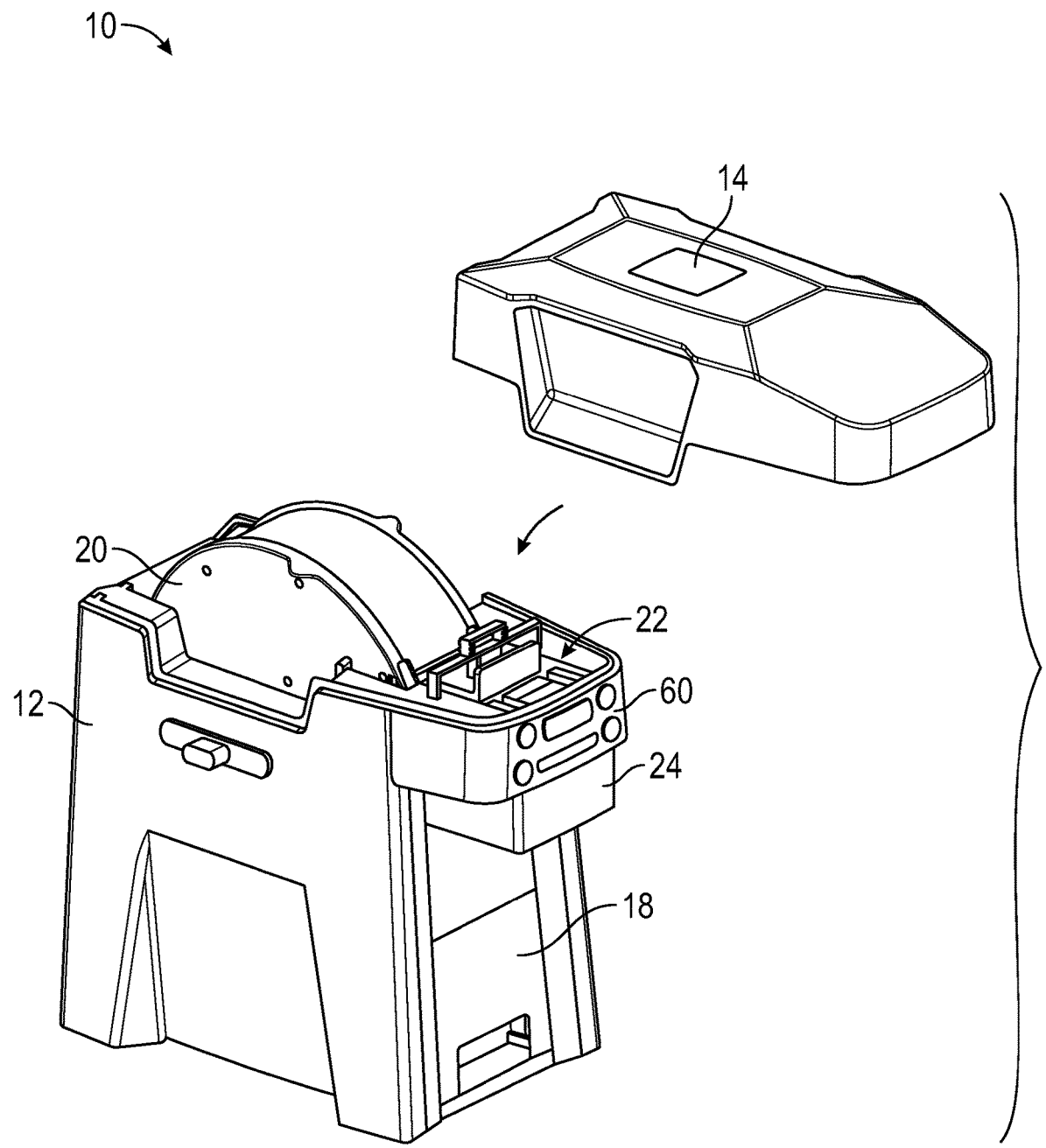
FIG. 3 is a perspective view of the ice cream roll maker of FIG. 1, showing installation of the cover.
Figure 4:
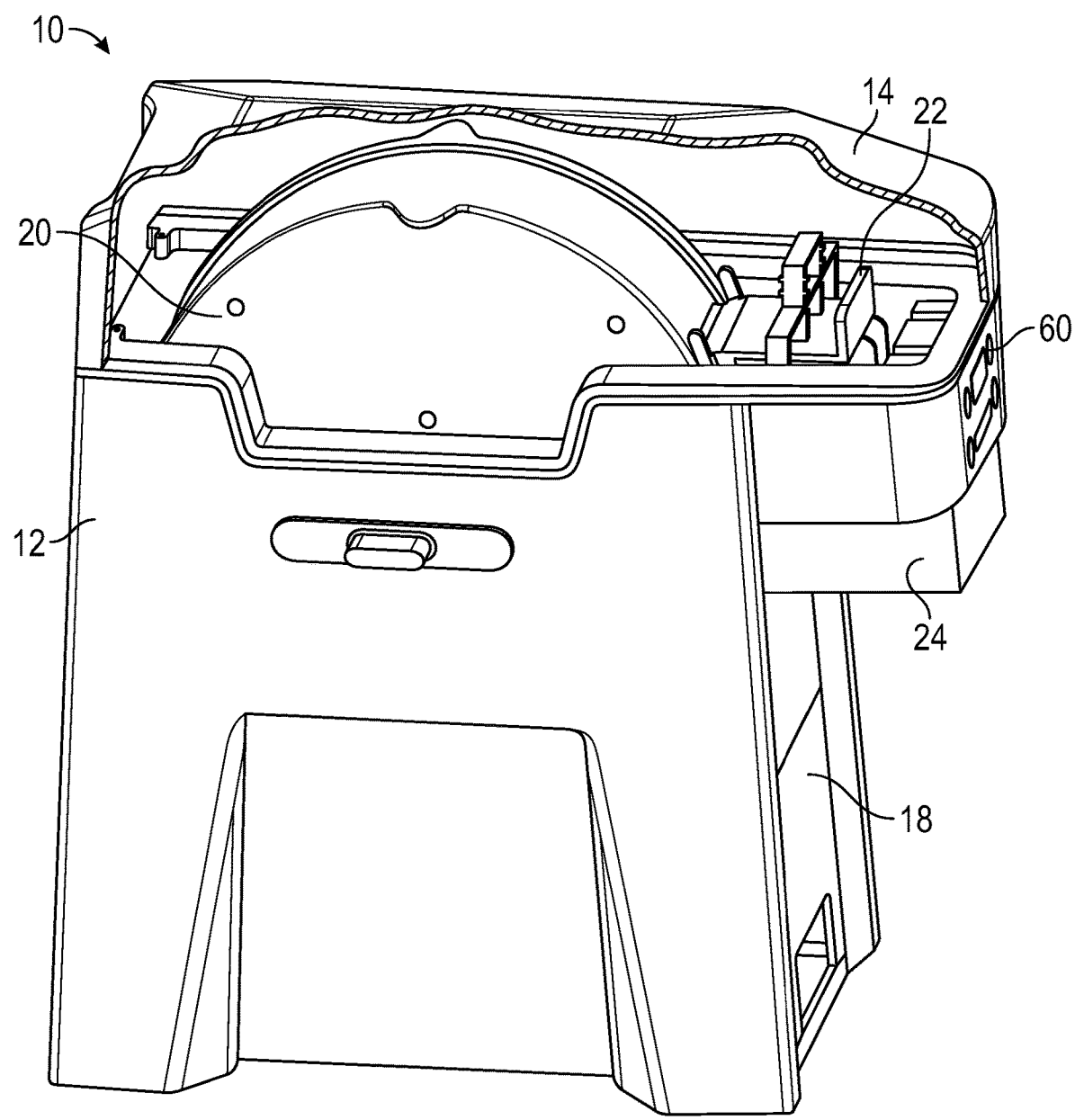
FIG. 4 is a partial see-through, perspective view of the ice cream roll maker of FIG. 1.

Referring to FIGS. 1-5, an ice cream roll maker 10 according to the present invention is shown. The ice cream roll maker 10 includes a generally rectangular housing 12 and a cover 14 that is releasably received atop the housing. In the preferred embodiment, the cover 14 is transparent and includes an access door or window 16 that can be opened to allow for the addition of toppings or other ingredients, as discussed in detail hereinafter.

As best shown in FIGS. 2-5, the ice cream roll maker 10 further includes a liquid container or reservoir 18 slidably received within a lower portion of the housing 12 and a freezer wheel 20 rotatably mounted about a horizontal axis within the housing above the reservoir 18. Within the front of the housing 12, a shovel or scraper 22 for forming ice cream rolls is mounted for sliding movement towards and away from the freezer wheel 20, as discussed in detail below. Below the scraper is arranged a roll container 24 for receiving formed ice cream rolls.

Figure 6:
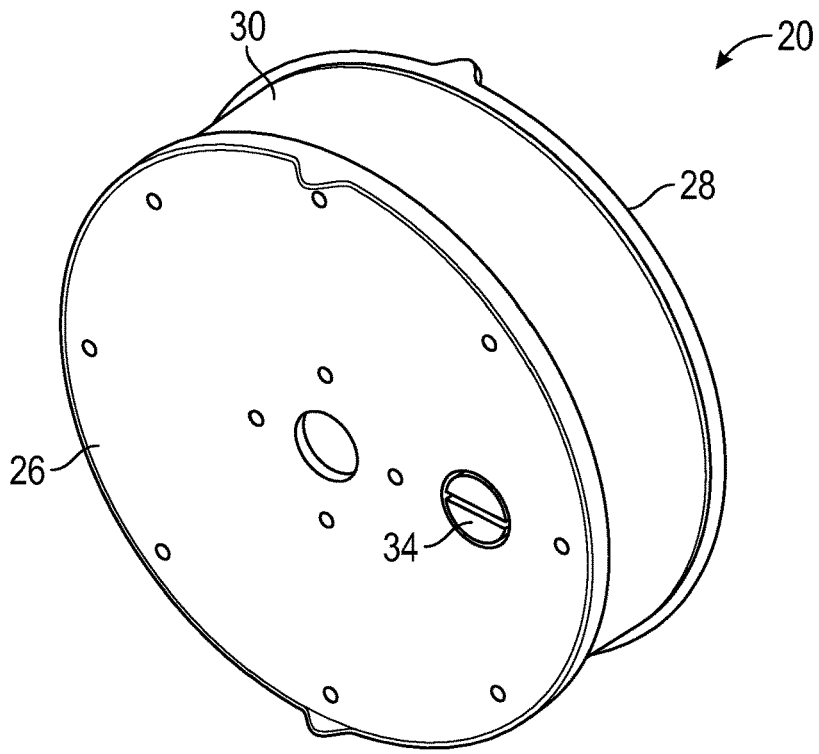
FIG. 6 is a perspective, left side view of the freezer wheel of the ice cream roll maker.
Figure 7:
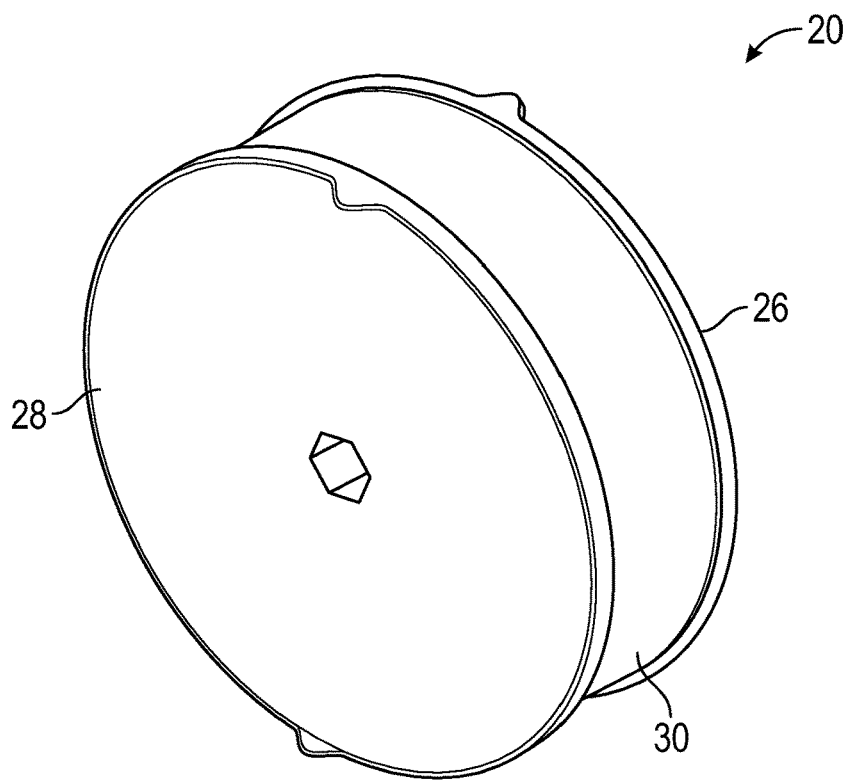
FIG. 7 is a perspective, right side view of the freezer wheel.
Figure 8:
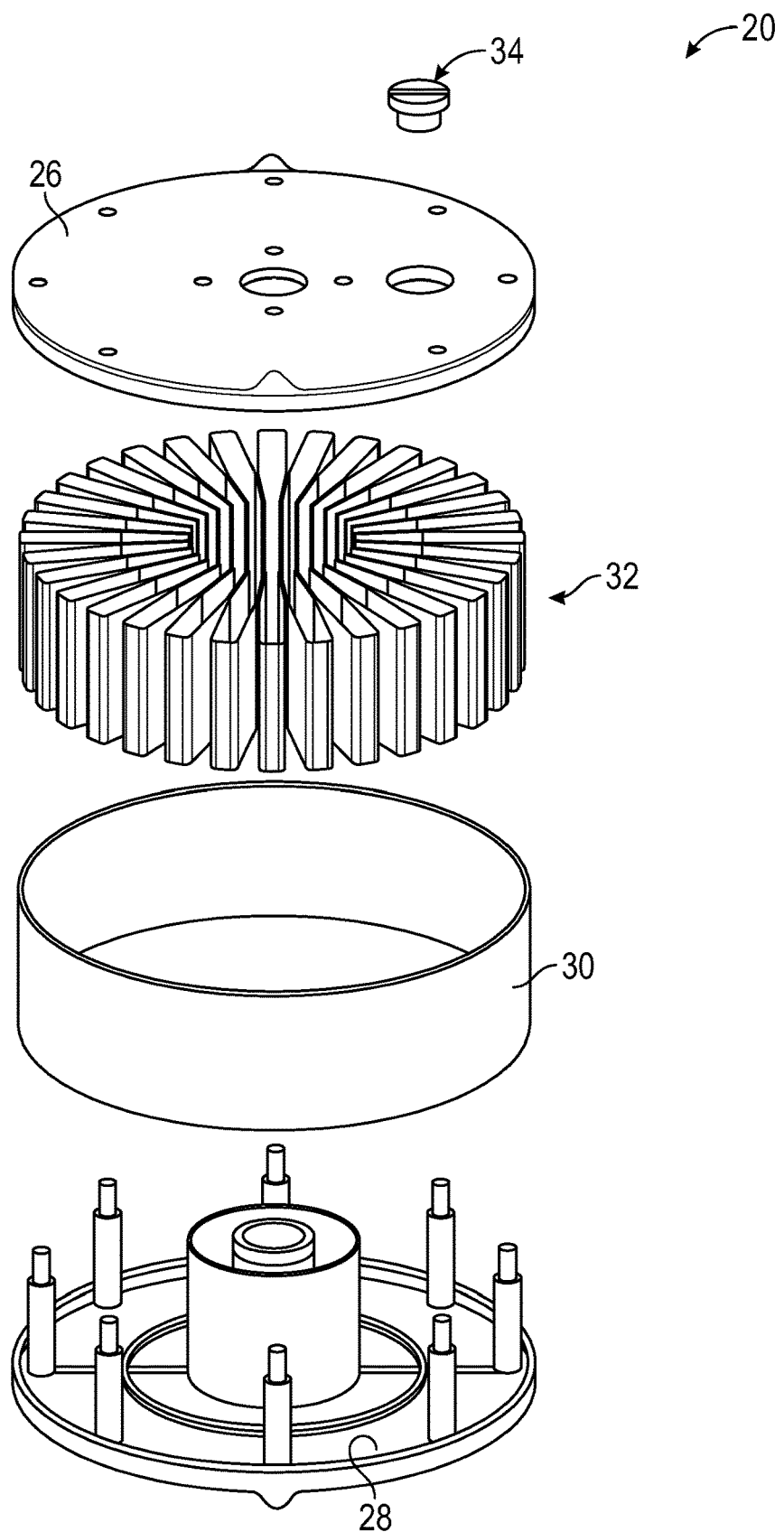
FIG. 8 is an exploded, perspective view of the freezer wheel.

With reference to FIGS. 6-8, the freezer wheel 20 is substantially disc or puck shaped and include first and second opposed covers 26, 28, respectively, joined by a circumferential wall 30 defining an outer surface of the wheel 20. As shown therein, the circumferential wall 30 has a diameter that is slightly less than a diameter of the opposed covers 26, 28 such that the wall 30 and covers 26, 28 define a shallow channel or groove in the freezer wheel 20. Within the freezer wheel 20 are arranged a plurality of heat transfer fins 32 in thermal communication with the circumferential wall 30. In an embodiment, both the wall 30 and the heat transfer fins 32 are formed from metal. The first cover 26 includes an aperture configured to receive a coolant plug 34. The freezer wheel 20 is configured to be filled with a liquid coolant or gel that is freezable or chillable in a household freezer.

Figure 5:
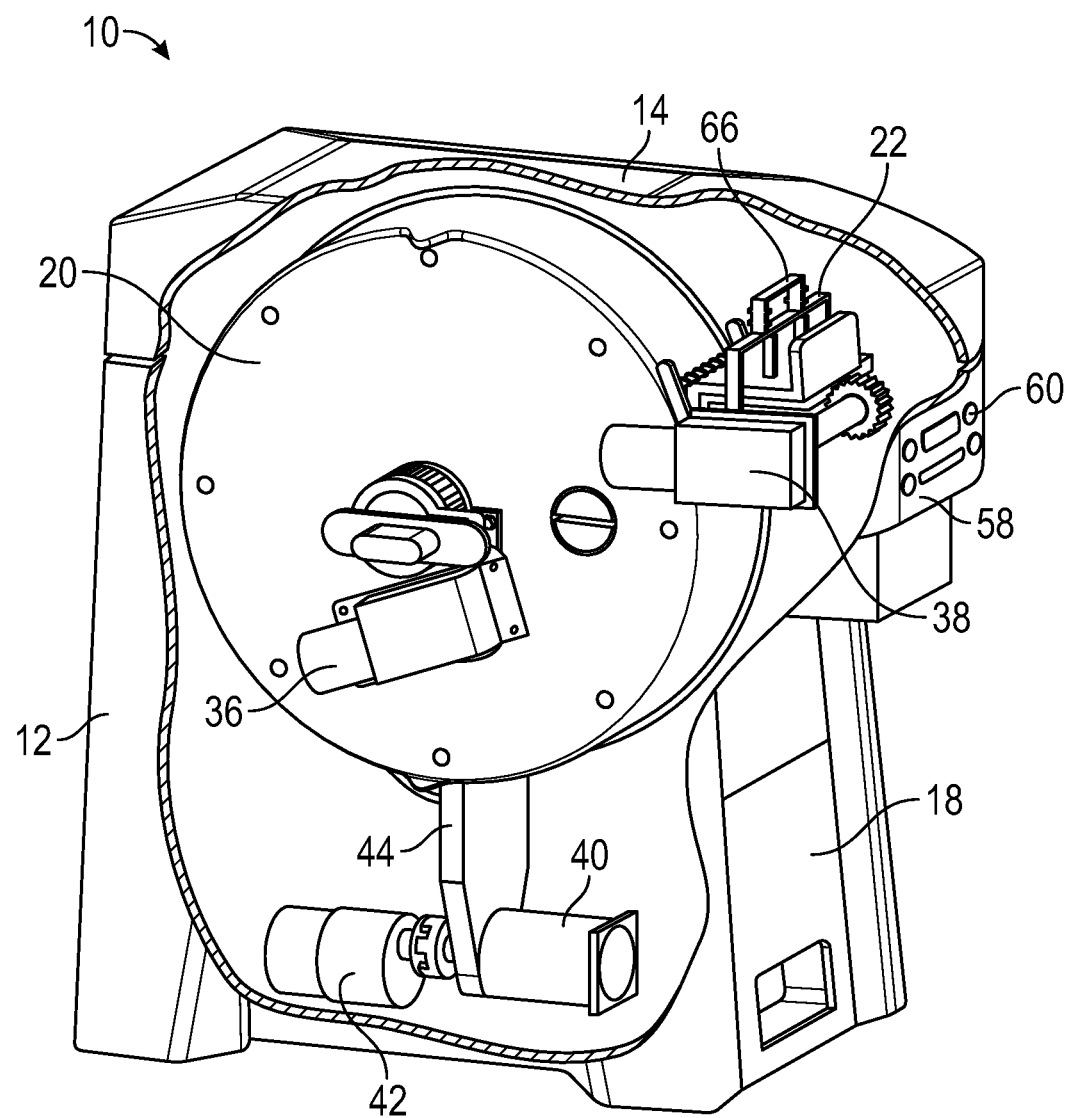
FIG. 5 is another partial see-through, perspective view of the ice cream roll maker of FIG. 1.

Referring once again to FIG. 5, the ice cream roll maker 10 includes a freezer wheel motor 36 operatively connected to the freezer wheel 20 for rotating the freezer wheel 20, and a shovel motor 38 operatively connected to the shovel 22 for moving the shovel 22 towards and away from the freezer wheel 20. As shown in FIG. 5, a slidable locking mechanism 37 accessible on the outside of the housing 12 may be utilized to selectively establish or disable a connection between the freezer wheel motor 36 and the freezer wheel 20. For example, the locking mechanism 37 may be actuated to decouple the motor 36 from the freezer wheel 20, allowing for removal of the freezer wheel 20 from the housing 12.

The ice cream roll maker 10 also includes a pump 40 disposed within the reservoir 18, and a pump motor 42 operatively connected to the pump 40. In an embodiment, the pump 40 is a screw pump, and is operable to pump liquid ingredients contained within the reservoir 18 to a coating device 44 also housed within the reservoir 18 and in association with the outer surface 30 of the freezer wheel 20. Other types of pumps, such as a centrifugal pump and the like, may also be utilized without departing from the broader aspects of the present invention.

Figure 9:
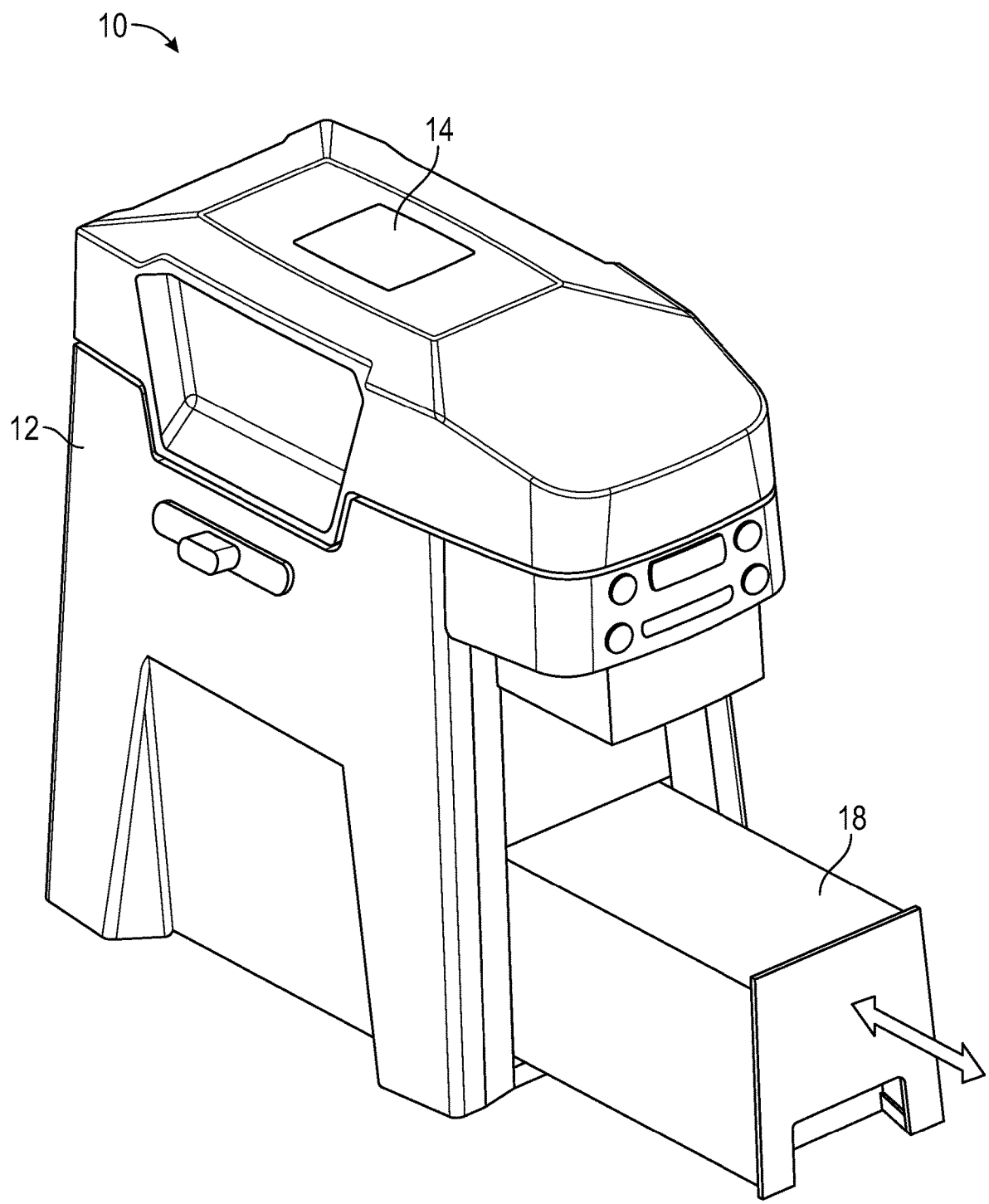
FIG. 9 is a perspective view of the ice cream roll maker of FIG. 1, illustrating slide-out of the liquid reservoir.
Figure 10:
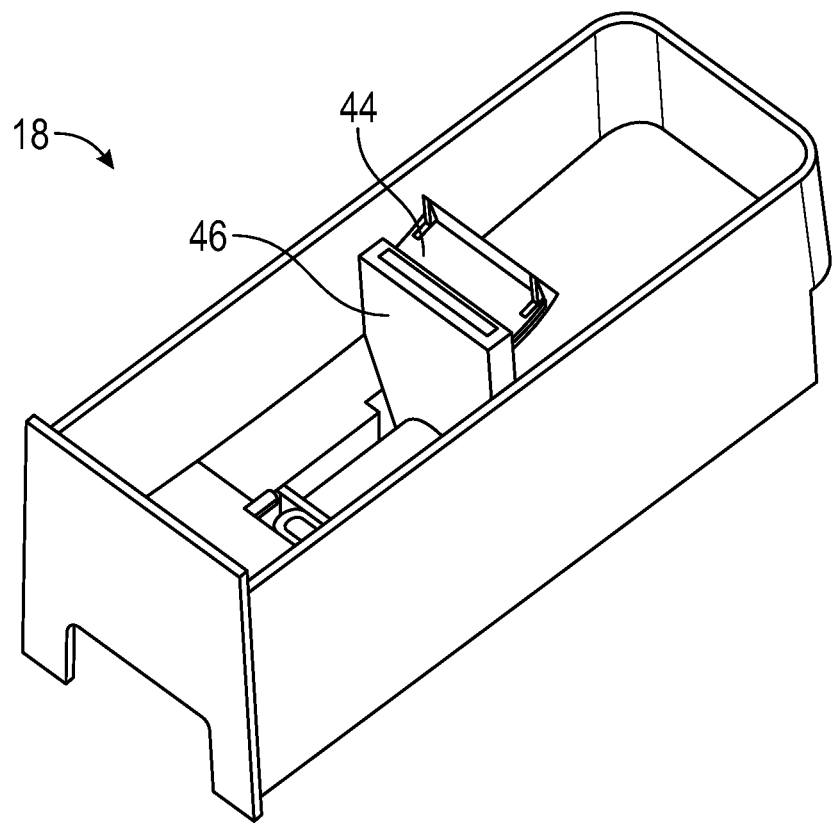
FIG. 10 is a perspective view of the liquid reservoir and coating device.
Figure 11:
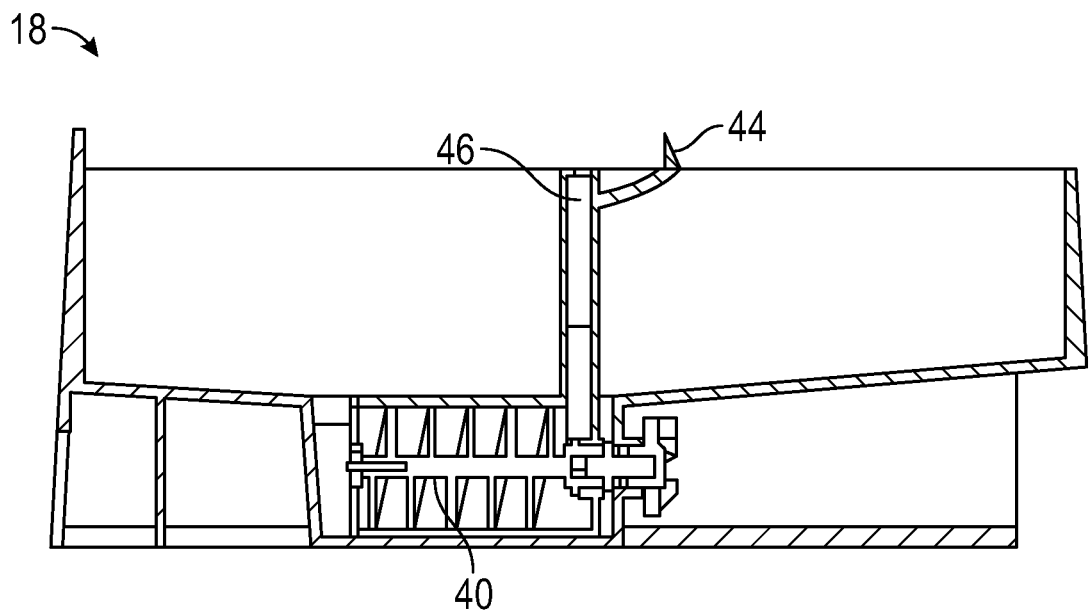
FIG. 11 is a side-cross sectional view of the liquid reservoir and coating device.
Figure 12:
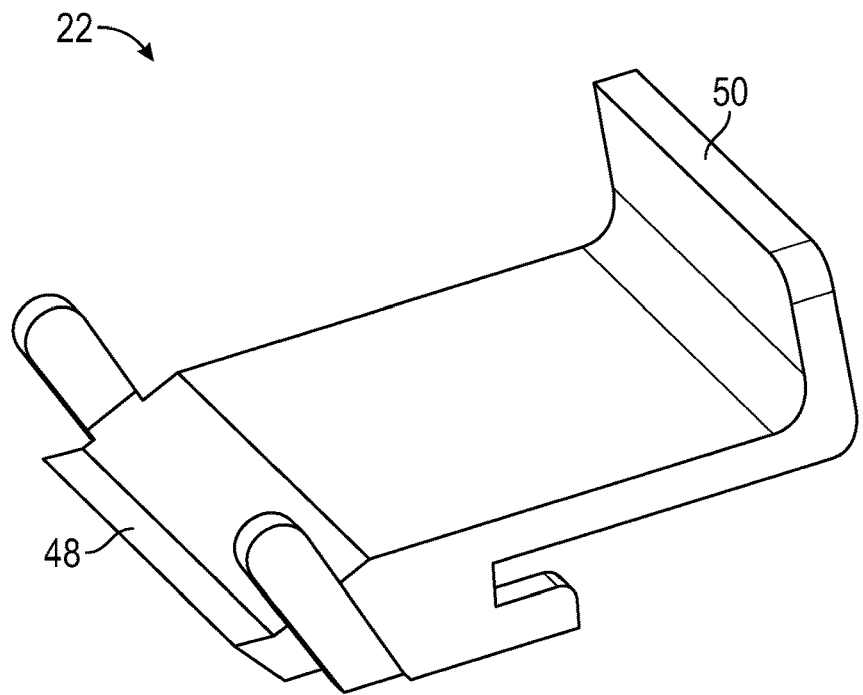
FIG. 12 is a perspective view of a roll-forming shovel of the ice cream roll maker of FIG. 1.
Figure 13:
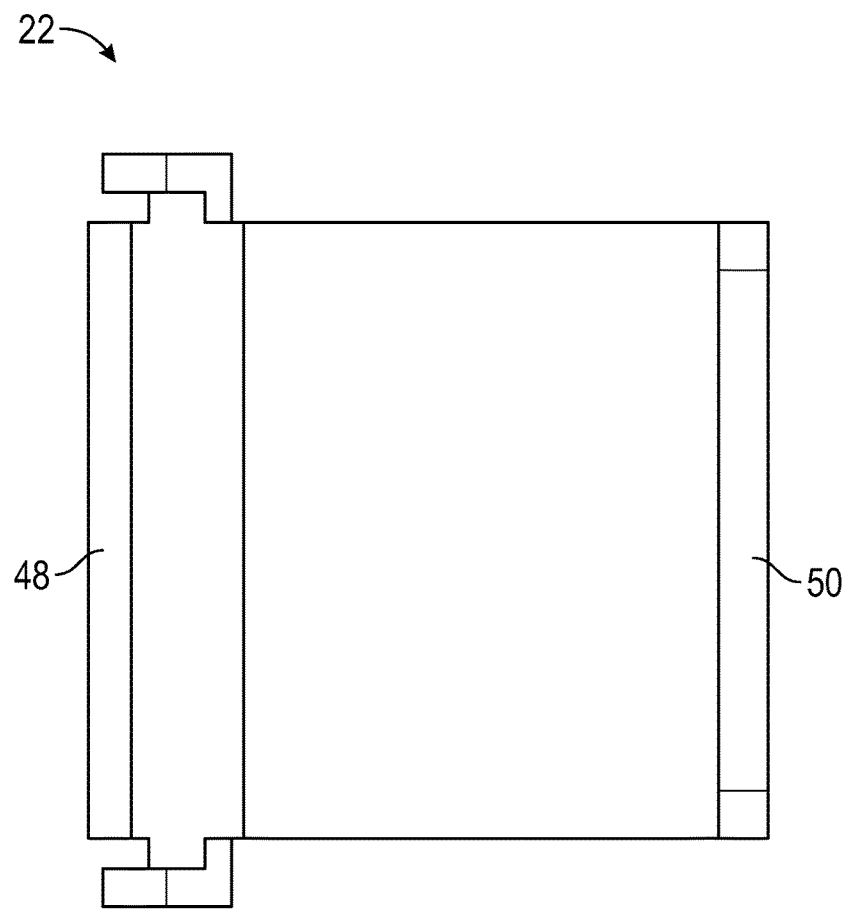
FIG. 13 is a top plan view of the shovel of FIG. 12.
Figure 14:
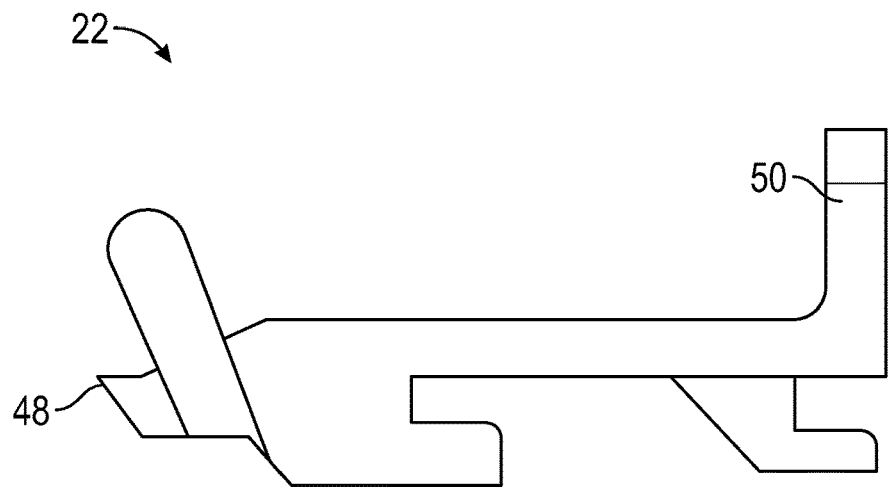
FIG. 14 is a side elevational view of the shovel of FIG. 12.
Figure 15:
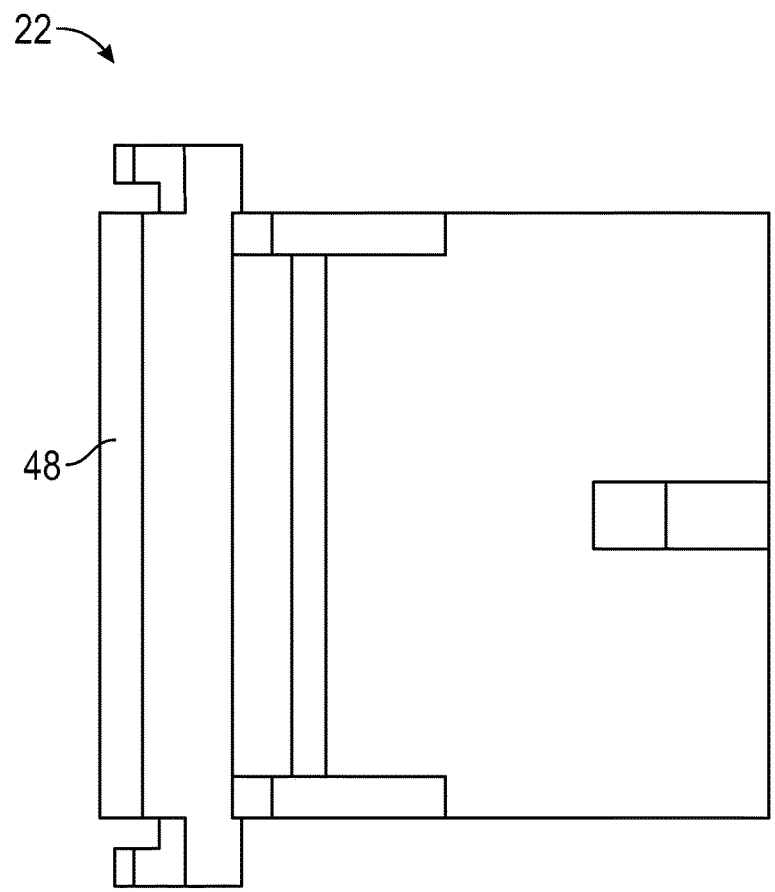
FIG. 15 is a bottom plan view of the shovel of FIG. 12.

FIGS. 9-11 better illustrate the configuration of the liquid reservoir 18 and the arrangement of the pump 40 and coating device 44 therein. The liquid reservoir 18 is generally rectangular in shape and includes the pump 40 positioned at the bottom thereof. A generally rectangular conduit 46 extends upward from the pump 40, terminating in an angled wiper blade defining the coating device 44.

Turning now to FIGS. 12-15, the shovel 22 is best illustrated. The shovel 22 includes a generally planar body having a leading or scraping edge 48 positioned adjacent to the freezer wheel 20 and a tab 50 opposite the leading edge 48. As indicated above, the shovel 22 is linearly movable under control of the motor, between a first position in which the leading edge 48 is in close association with the outer surface 30 of the freezer wheel 20, and a second position in which the leading edge 48 is spaced from the outer surface 30 of the freezer wheel 20.

Figure 16:
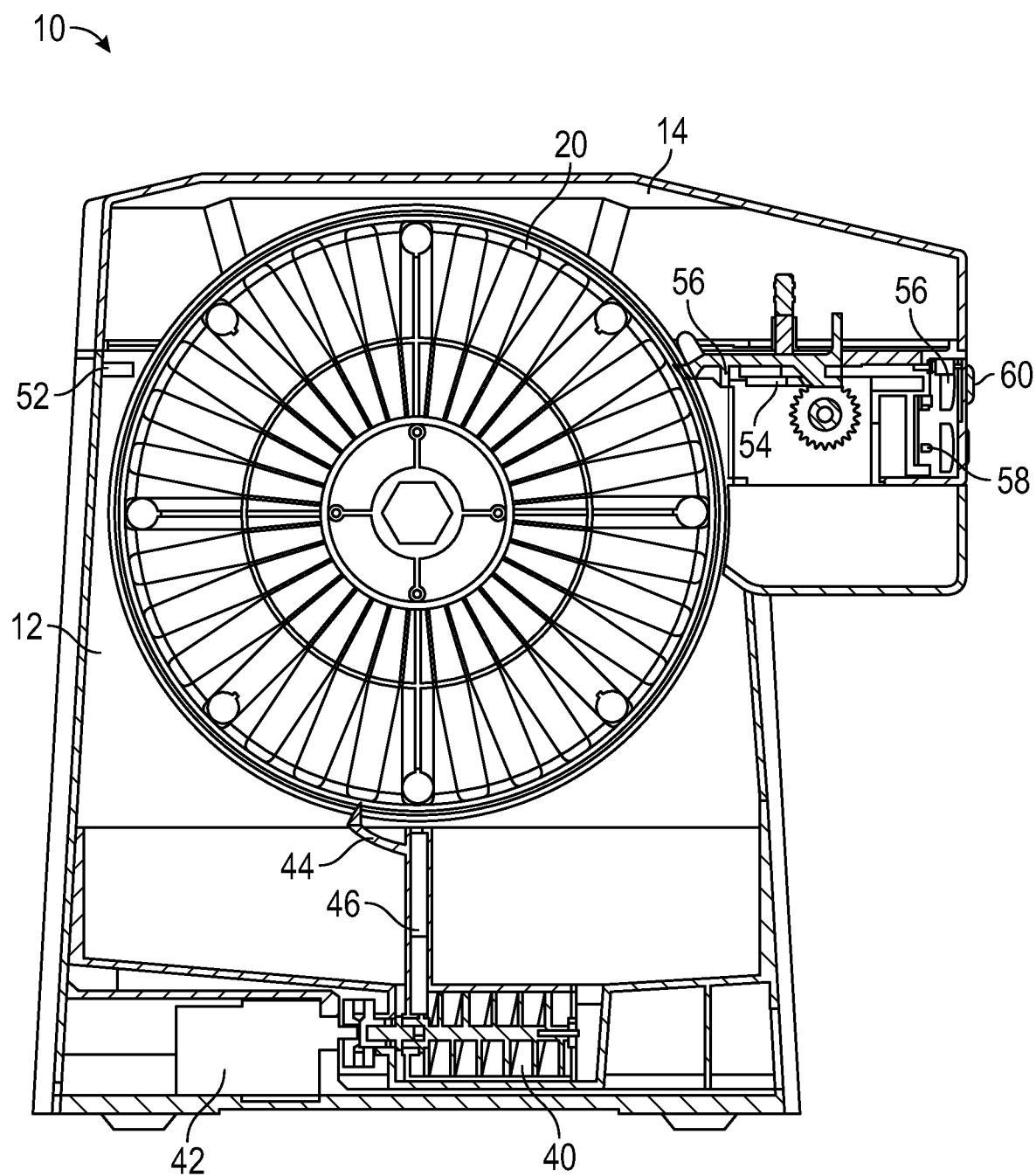
FIG. 16 is a cross-sectional illustration of the ice cream maker of FIG. 1.

As shown in FIG. 16, the ice cream roll maker 10 may include an array of sensors for detecting various operational parameters of the device. For example, the ice cream roll maker 10 may include a freezer wheel position sensor 52 associated with the freezer wheel 20, for detecting a rotational speed and distance of the freezer wheel 20. In particular, in an embodiment, the position sensor 52 may be utilized to keep count of the number of rotations of the wheel 20, indicating the number of coatings applied to the outer surface 30 of the wheel 20, as discussed in detail hereinafter. The roll maker 10 may also include a temperature sensor 54 configured to detect a temperature of the outer surface 30 of the freezer wheel 20, and one or more shovel position sensors 56 for detecting the linear position of the shovel 22 (i.e., spaced from the outer surface 30 of the freezer wheel 20, or in close association with the freezer wheel 20). In an embodiment, the temperature sensor 54 and the position sensors 56 may be touch type sensors (e.g., NTC sensors) or non-touch sensors (e.g., infrared beam). The sensors 52, 54, 56 are each in communication with a controller 58 (such as a PCB control device) which can likewise receive manual inputs from a control panel 60 on the front of the device. As discussed hereinafter, the controller 58 may be programmed to execute a pre-set ice cream roll making operation.

Figure 28:
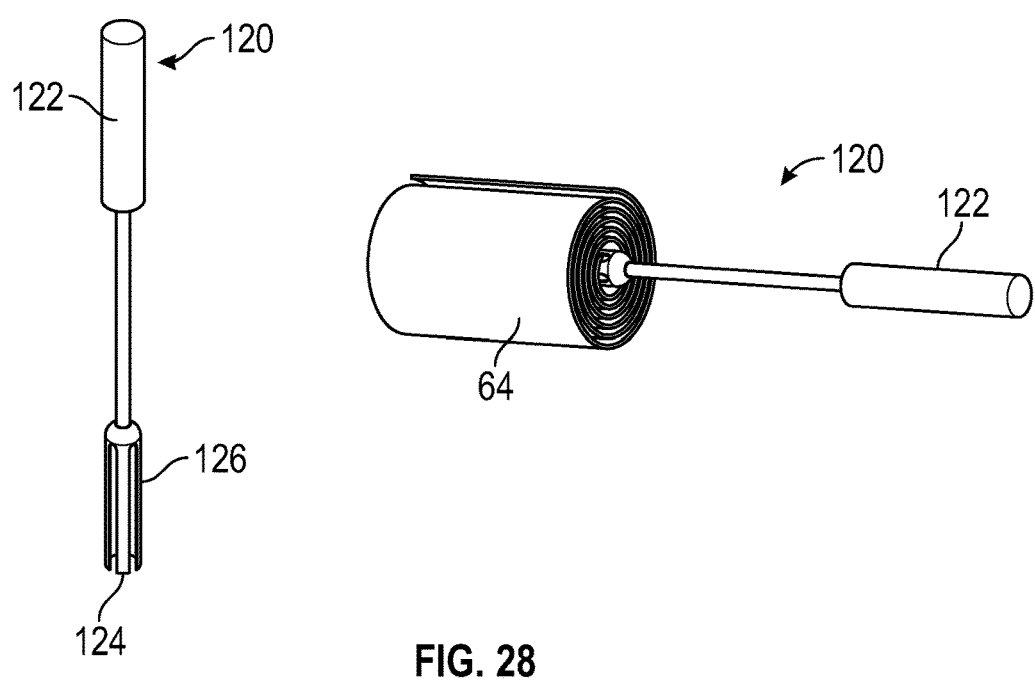
Figure 29:
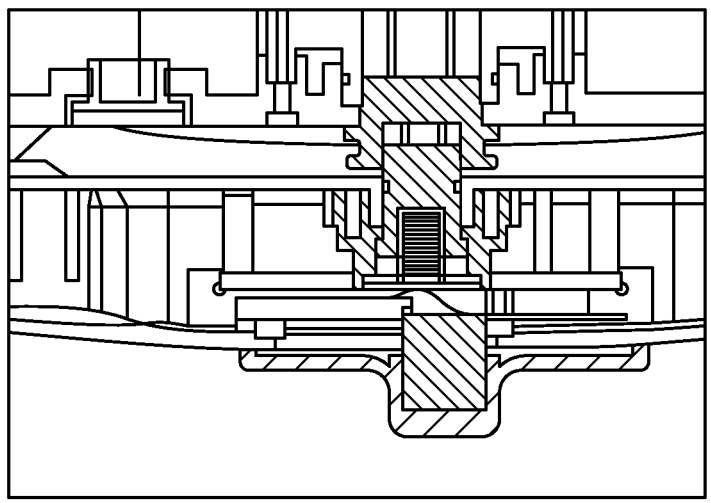
FIG. 29 illustrates an engagement mechanism between the freezer wheel motor and the freezer wheel.
Figure 29:
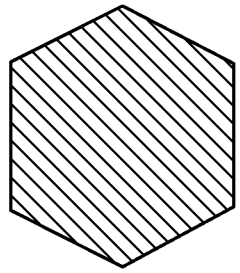
Figure 29:
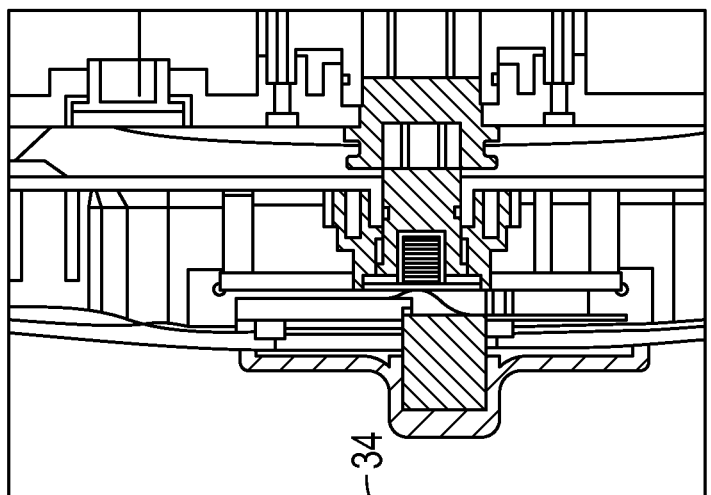
Figure 29:
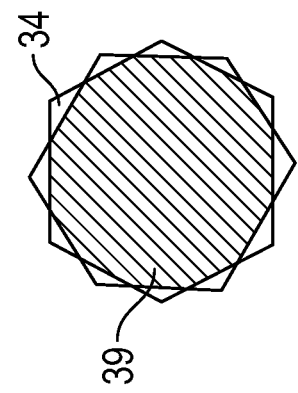
Figure 29:
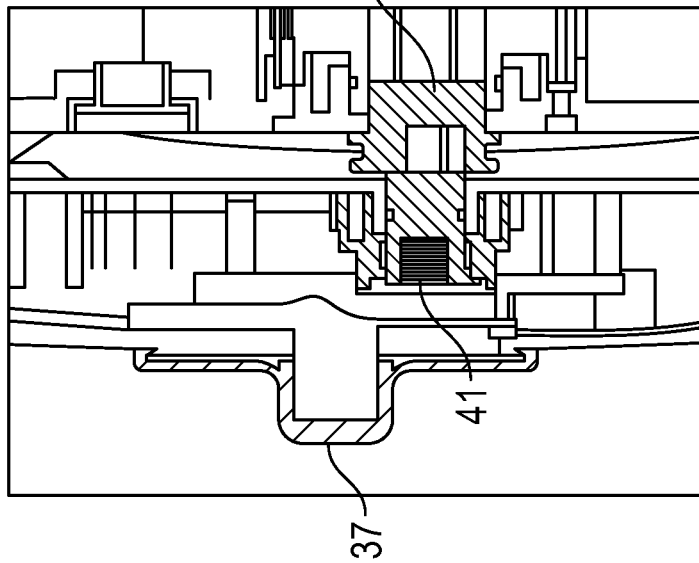
Figure 29:
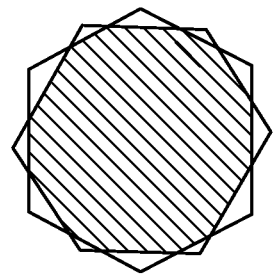

With reference to FIG. 29, when operation begins, the freezer wheel motor 36 activates and rotates a lock piston 39. As illustrated in FIG. 28, both the lock piston 39 and the freezer wheel plug 34 may be hexagonal in shape. When the lock piston 39 rotates and fits with the plug 34, a spring 41 behind the lock piston 39 pushes on the lock piston 39 into engagement with the freezer wheel plug 34. The freezer wheel 20 may then rotate together with the lock piston 39.

Figure 17:
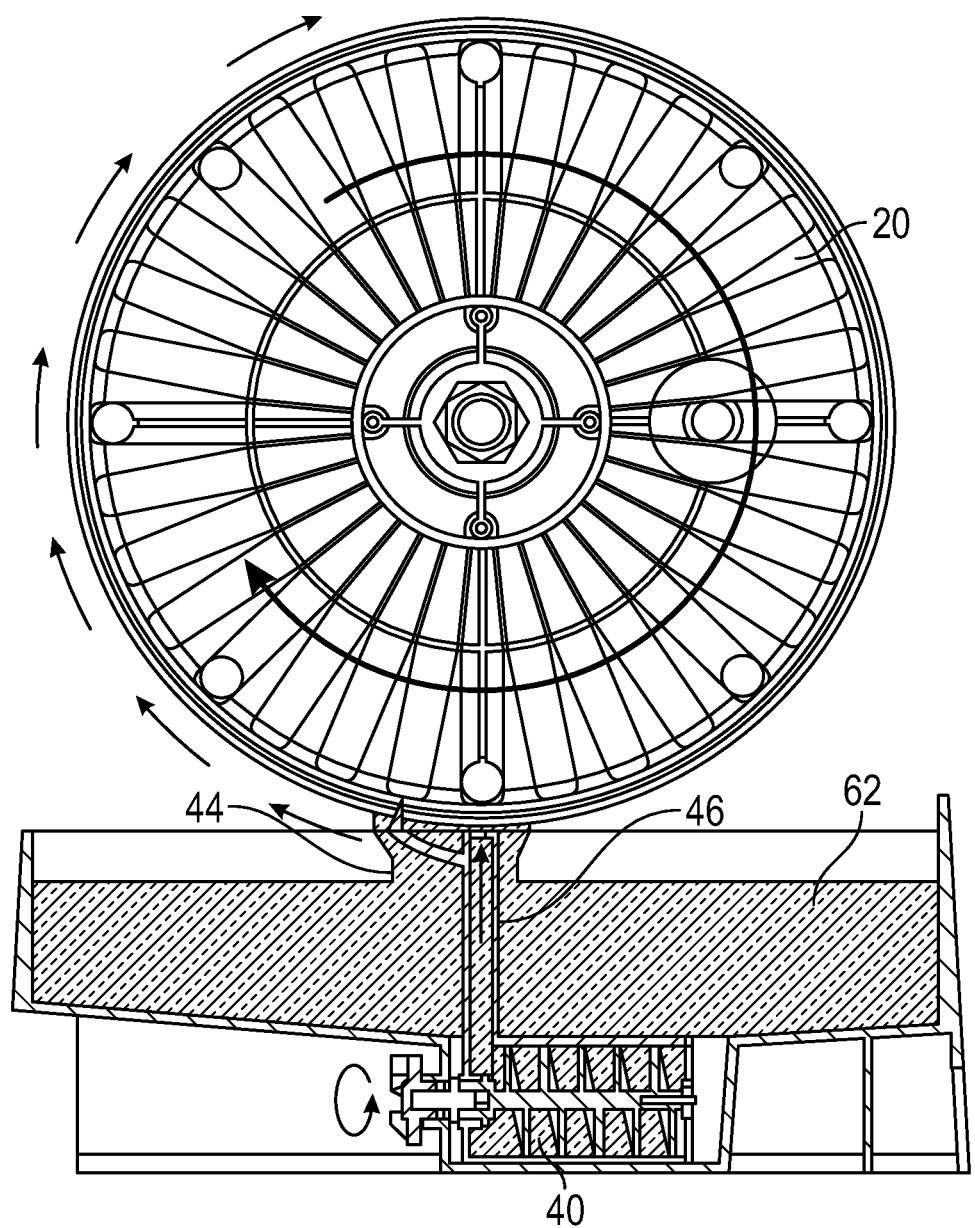
FIG. 17 is a cross-sectional illustration of a portion of the ice cream maker, illustrating a coating operation.

Turning now to FIG. 17, a coating operation of the ice cream roll maker 10 is illustrated. After the freezer wheel 20 is chilled, it may be inserted into the housing 12, at which time a user can slide locking mechanism 37 to couple the motor 36 to the freezer wheel 20 in the manner described above. A liquid ice cream mixture can be loaded into the reservoir and a user may initiate operation by actuating a switch or button on the control panel 60. Under control of the controller 58, the freezer wheel motor 36 is then actuated to rotate the freezer wheel 30 and the pump 42 is actuated to pump the liquid ice cream mixture 62 through the conduit 46 to the coating device 44. As the ice cream mixture 62 reaches the coating device 44, the wiper of the coating device 44 deposits a thin, even layer on the cold outer surface 30 of the rotating freezer wheel 20.

Figure 18:
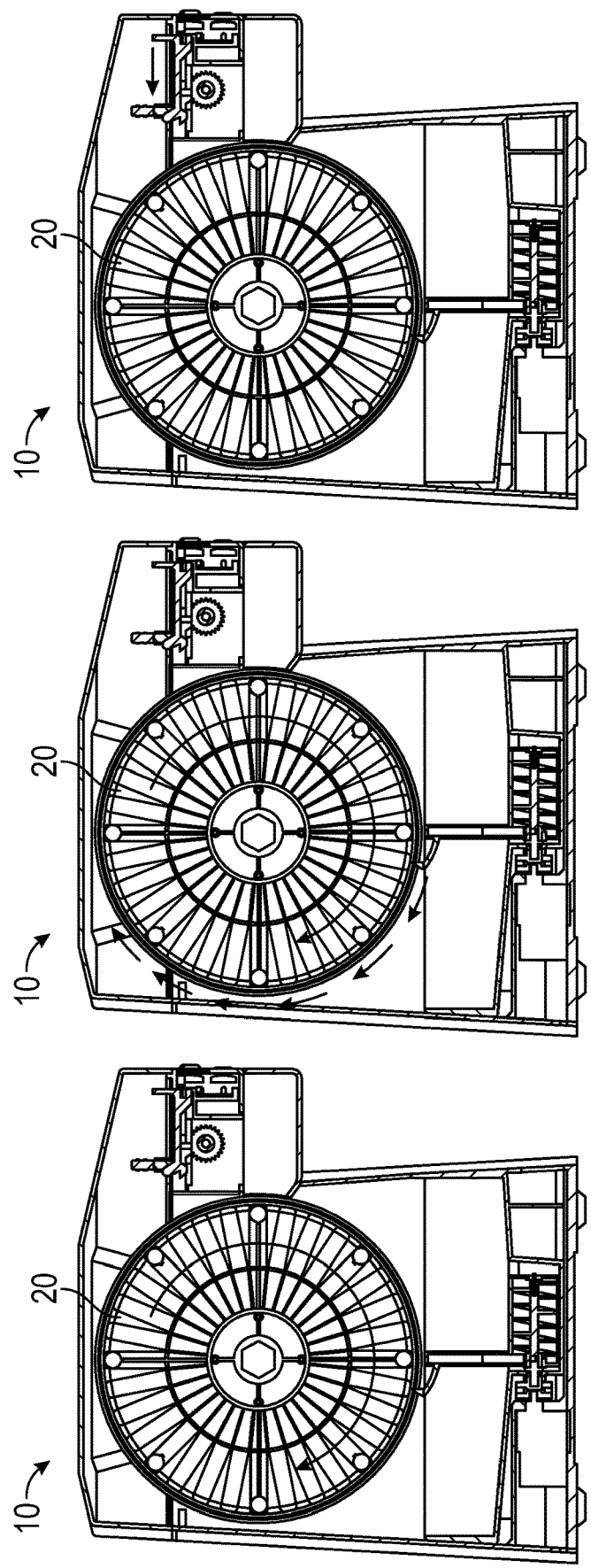
FIG. 18 is a process flow diagram illustrating the making of ice cream rolls utilizing the ice cream maker of FIG. 1.
Figure 18:
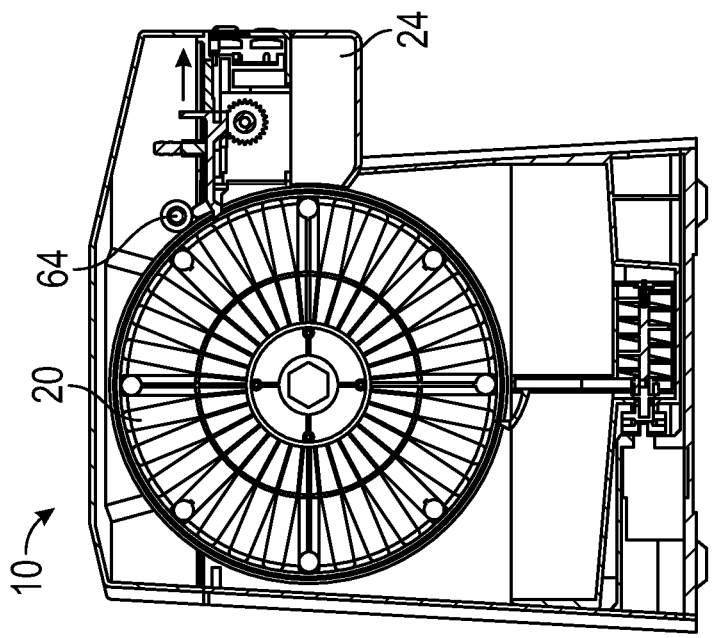
Figure 18:
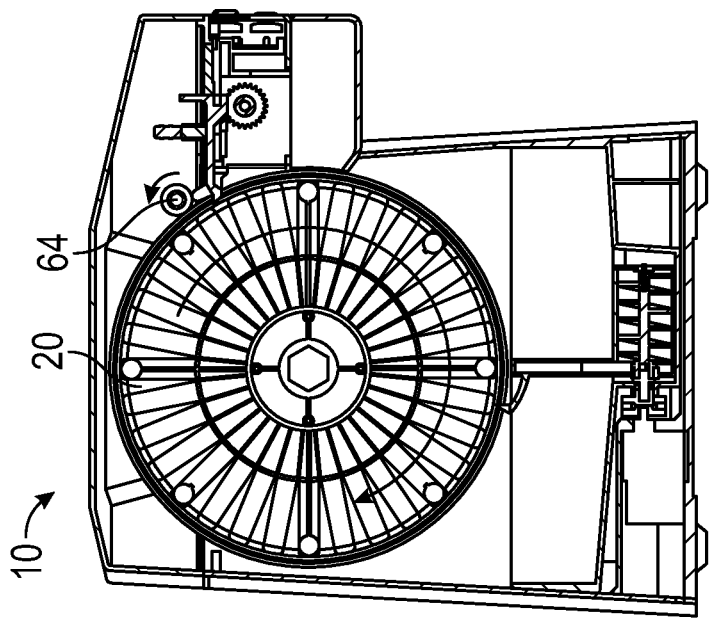

With reference to FIG. 18, in operation, the freezer wheel 20 is rotated by the motor 36 and the position of the freezer wheel (as well as the number of rotations) is detected by the position sensor 52, which is communicated to the controller 58 (as shown at (1)). The liquid ice cream mixture is then pump by pump 40 to the coating device 44, where is applied as an even layer to the outer surface 30 of the freezer 20 wheel while it rotates, as shown at (2). Because the outer surface 30 is cold, the liquid mixture is transformed into a frozen coating layer on the outer peripheral surface 30 of the freezer wheel 20. After a predetermined number of rotations of the freezer wheel 20, as determined by the controller 58, the shovel motor 38 is activated to move the shovel 22 towards the freezer wheel, as indicated at (3). As indicated at (4), the leading edge 48 of the shovel 22 is brought into close association with the outer surface 30 of the freezer wheel 20, until it cuts through the frozen coating layer on the outer surface 30 of the freezer wheel 20, and essentially scrapes the frozen coating layer from the outer surface 30. As the freezer wheel 20 continues to rotate, the frozen coating layer is formed into a roll 64. After a predetermined number of rotations, the controller 58 deactivates the motor 36 and retracts the shovel 22 until it reaches the position sensor 56, as shown at (5), causing the ice cream roll 64 to drop into the ice cream roll container 24.

Figure 19:
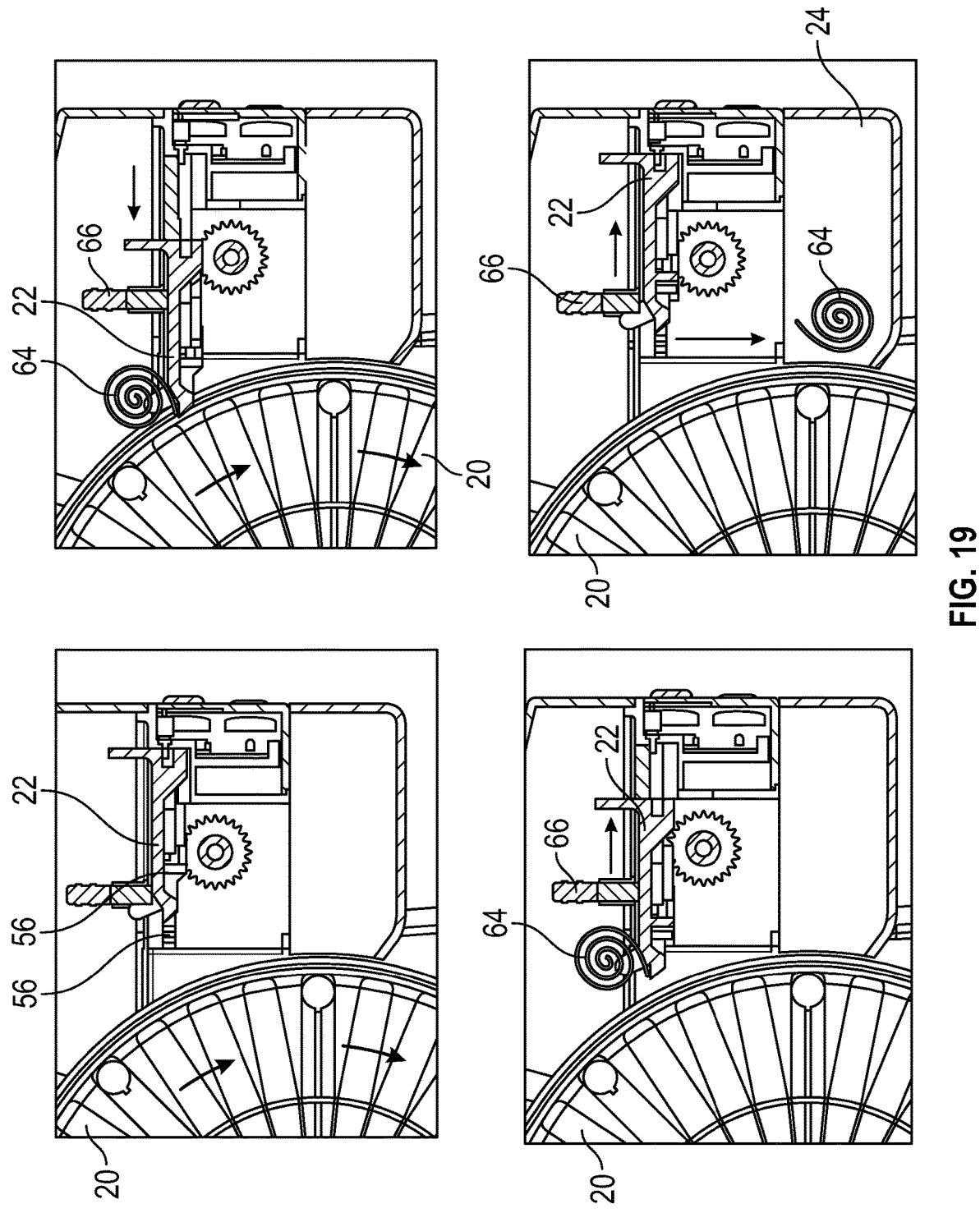
FIG. 19 is a process flow diagram illustrating movement of the roll-forming shovel during an ice cream roll making operation.

FIG. 19 more clearly illustrates operation of the shovel 22 to form the ice cream roll 64. As shown therein, at (1), after the coating of ice cream, the shovel 22 moves towards the coated freezer wheel 20 and cuts into the frozen ice cream layer. The shovel 22 then stops after touching the shovel position sensor 56. As the freezer wheel 20 continues to rotate, the frozen ice cream layer is scraped from the freezer wheel 20 and formed into a roll 64 by the shovel 22, as shown at (2). Rotation of the freezer wheel 20 is then ceased at a designated rotation angle, as communicated by the wheel position sensor 52 (e.g., after 360 degrees of rotation). As shown at (3), the shovel 22 is then moved rearward, away from the freezer wheel 20, separating the roll 64 from the freezer wheel 20. As the roll 64 is moved rearward by the shovel 22, it contacts a static pushing member 66, which causes the roll 64 to drop off of the shovel 22 and into the roll container 24. Motion of the shovel 22 is ceased when it reaches the opposing position sensor 56.

Figure 20:
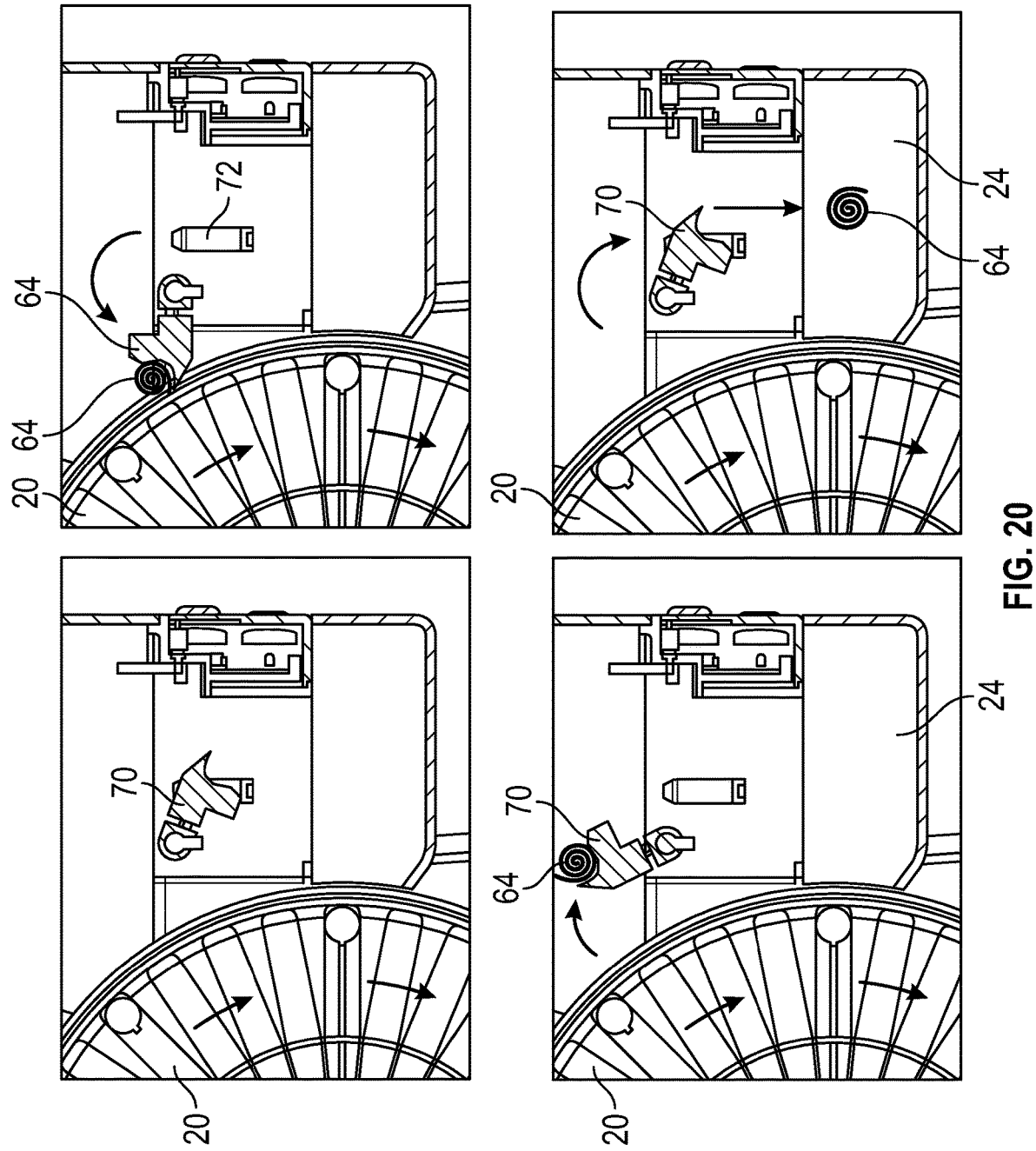
FIG. 20 is a process flow diagram illustrating operation of an alternative roll-forming shovel during an ice cream roll making operation.

Turning now to FIG. 20, an alternative ice cream rolling mechanism is shown. As illustrated therein, the rolling mechanism, rather than taking the form of a linearly movable shovel 22, may be constructed as a rotatable shovel 70. As shown therein, using the rotatable shovel 70, in operation, after coating the wheel with the liquid ice cream mixture to form a frozen layer on the outer surface 30 of the wheel 20 in the manner described above, the shovel 70 is rotated in a counterclockwise direction to cut into the frozen ice cream layer (as shown at (1)). The shovel 70 is stopped after touching a position sensor. As shown at (2), as the freezer wheel 20 continues to rotate, the ice cream layer is formed into a roll 64. Rotation of the freezer wheel 20 is then stopped after a designated angular rotation (e.g., 360 degrees). As shown at (3), the shovel 70 is then rotated in a clockwise direction to drop the formed ice cream roll into the container 24. In particular, as shown at (4), the ice cream roll 64 reaches a roll pushing member 72 and falls down into the roll container 24, while the shovel 70 continues to rotate until it touches the shovel position sensor.

Figure 21:
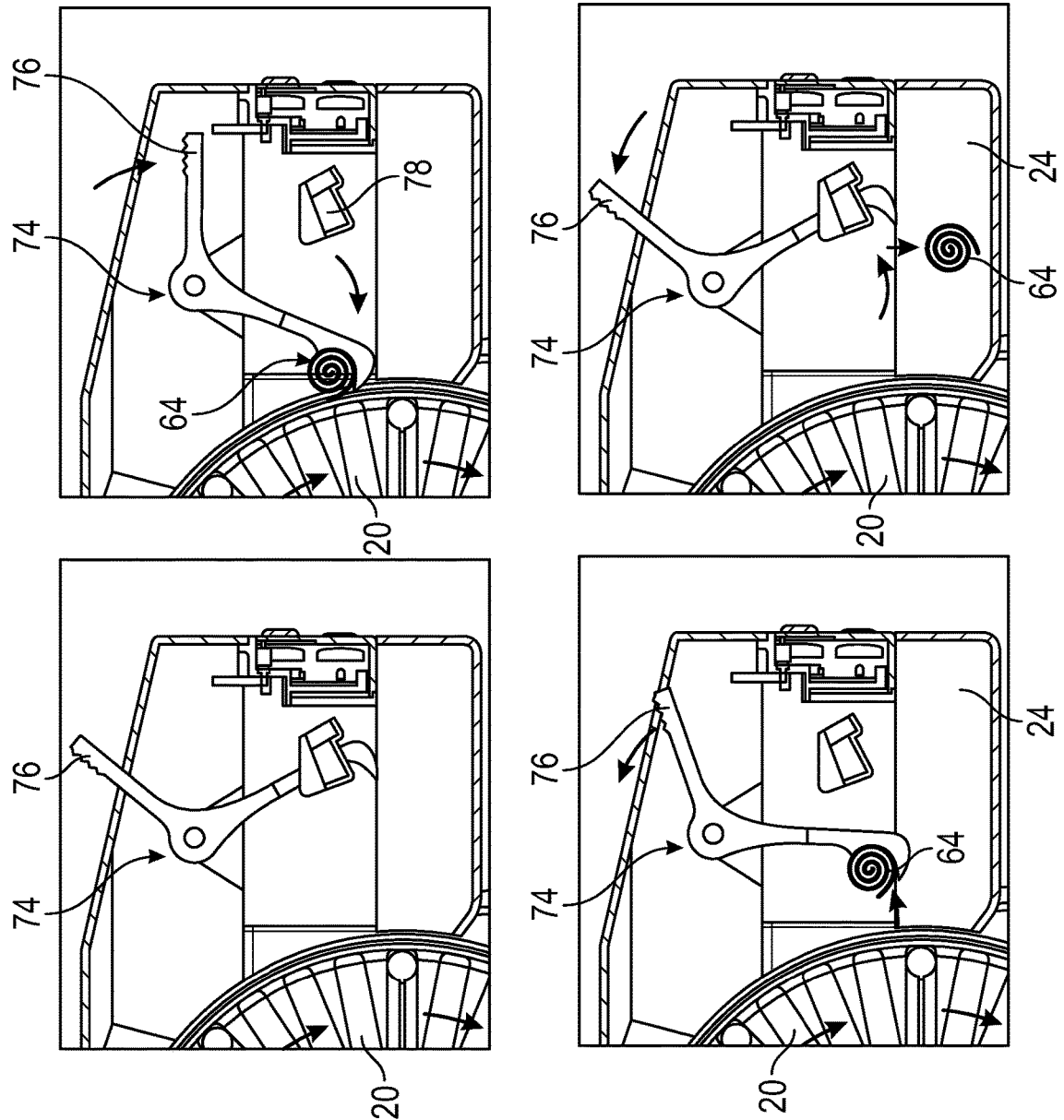
FIG. 21 is a process flow diagram illustrating operation of a manual roll-forming shovel during an ice cream roll making operation.

FIG. 21 illustrates another alternative shovel configuration and a manual roll forming operation. In contrast to FIGS. 19 and 20, the embodiment illustrated in FIG. 21 utilizes a manual (non-motorized) shovel 74 having a grippable handle 76. In operation, after coating the wheel 20 with the liquid ice cream mixture to form a frozen layer on the outer surface 30 of the wheel 20 in the manner described above, a user presses on the handle 76 of the shovel 74 against a spring bias to rotate the shovel 74 clockwise until it cuts into the frozen ice cream layer on the outer surface 30 of the wheel 20, as show at (1). As shown at (2), as the freezer wheel 20 continues to rotate, the ice cream layer is formed into a roll 64 by the shovel 74. Rotation of the freezer wheel 20 is then stopped after a designated angular rotation (e.g., 360 degrees). As shown at (3), a user may then release the handle 76, causing the shovel 74 to rotate in a counterclockwise direction under urging from a coil spring (not shown) to drop the formed ice cream roll into the container 24. In particular, as shown at (4), the ice cream roll 64 reaches a roll pushing member 78 and falls down into the roll container 24, while the shovel 70 continues to rotate until it reaches its original position out of engagement with the freezer wheel 20.

In connection with the embodiments described above, the controller 58 is configured to carry out pre-set ice cream roll making operations in dependence upon user inputs (such as input using the control panel 60) and operational parameters detected by the sensors 52, 54, 56. In particular, the controller 58 is configured to control the speed of the pump 42 (and therefore the flow rate of the liquid mixture to the coating device 44) and the rotational speed of said freezer wheel 20 in dependence upon the temperature of the outer peripheral surface 30 of said freezer wheel 20.

For example, in the preferred embodiment, the controller 58, via the temperature sensor 54, continuously or intermittently monitors the temperature of the outer surface 30 of the freezer wheel 20. This feedback signal is then utilized by the controller 58 to control the freezer wheel motor speed, movement of the shovel 22, and the pump speed, providing autonomous and 'smart' adjustment of the roll making process. In an embodiment, a lower detected functional temperature range for the wheel 20 will cause the controller 58 to select a faster wheel and pump speed, while a higher detected functional temperature range will prompt the controller 58 to select a slower wheel and pump speed. As will be readily appreciated, by controlling the pump speed and wheel rotational speed in dependence upon the temperature of the wheel, ice cream layer formation may be optimized, allowing a better product to be produced.

Figure 22:
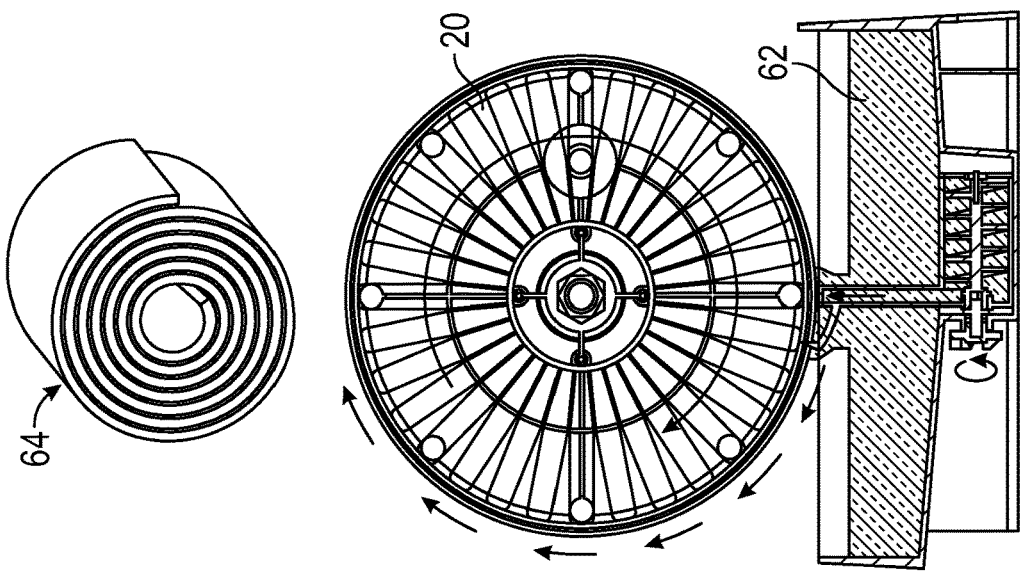
FIG. 22 is a schematic illustration showing the making of ice cream rolls of various thickness.
Figure 22:
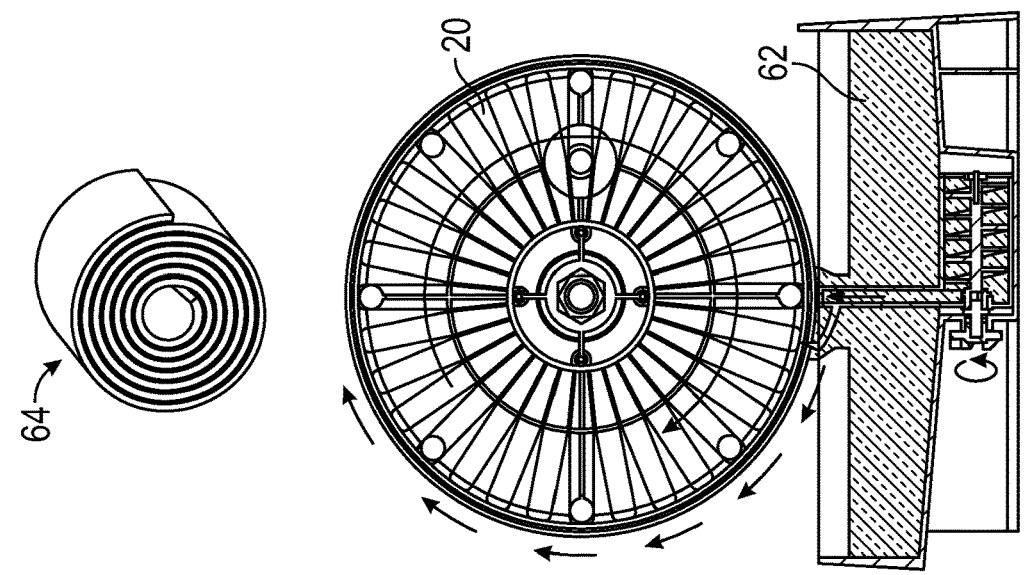
Figure 22:
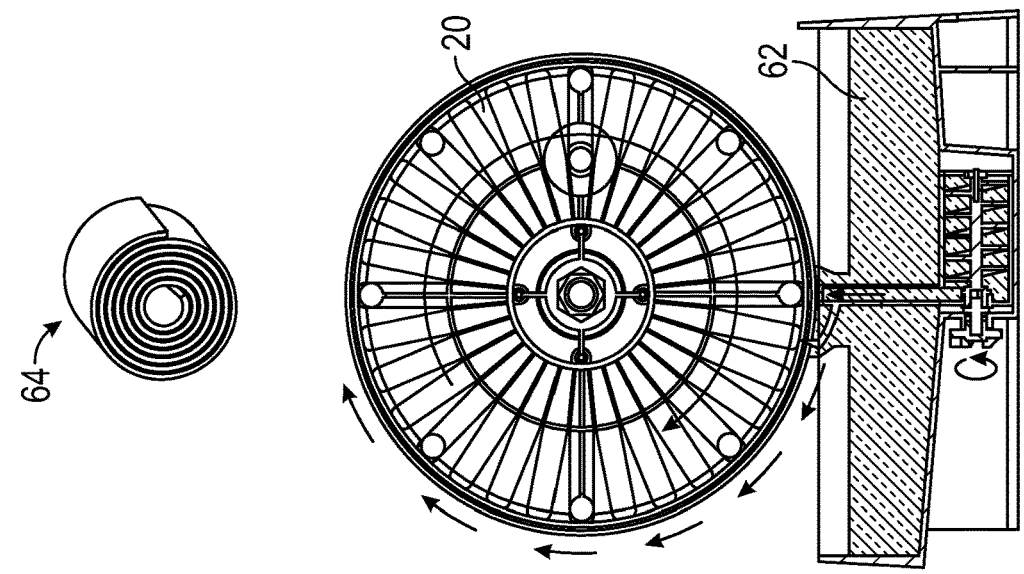
Figure 23:
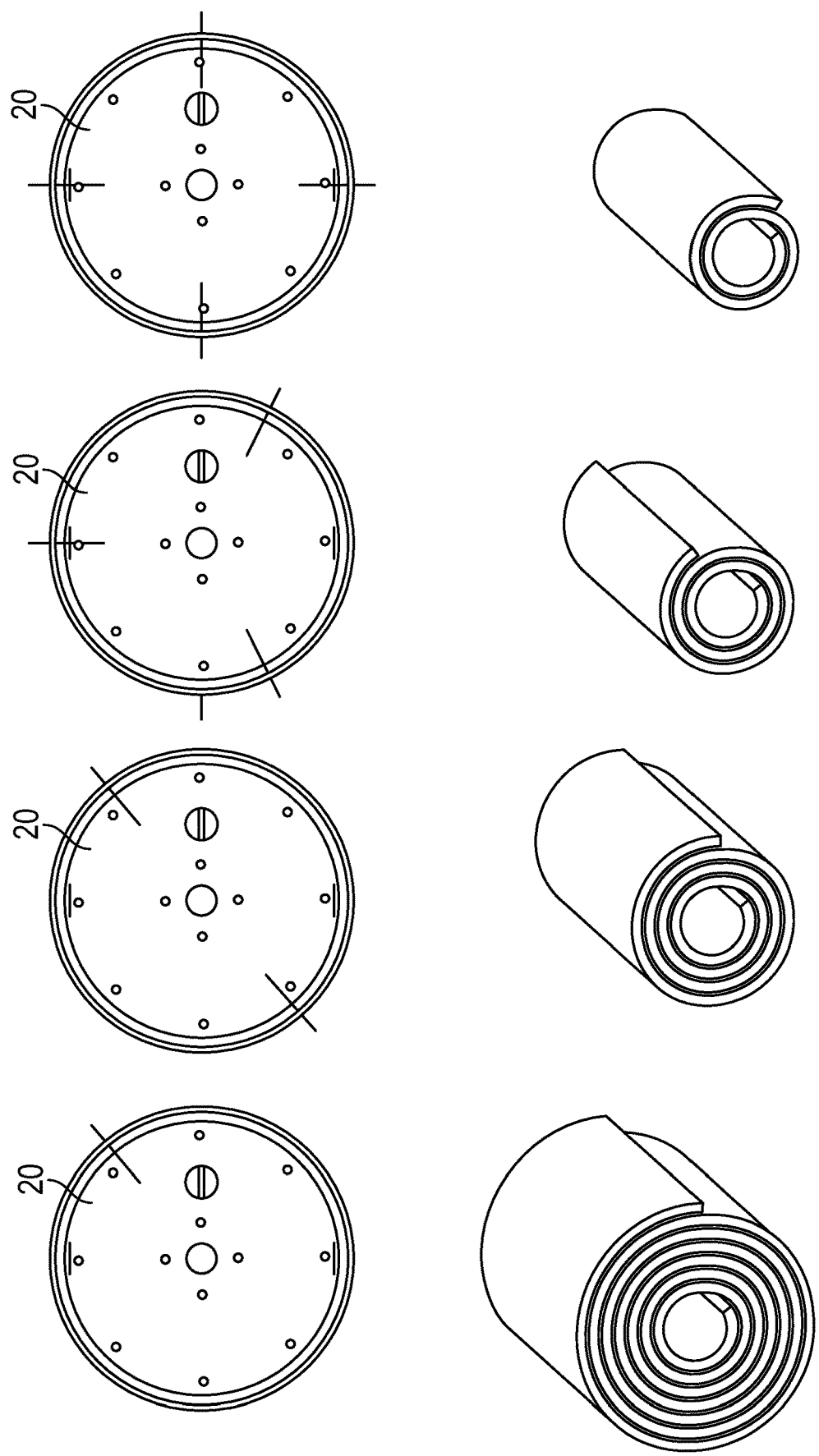
FIG. 23 is another schematic illustration showing the making of ice cream rolls of various thickness.

With reference to FIG. 22, the ice cream roll maker 10 is operable to vary the roll thickness, by varying the number of coating layers applied to the outer surface 30 of the freezer wheel 20 prior to engagement of the shovel 22 with the wheel 20. In particular, as illustrated in FIG. 22, a greater number of coating layers translates to increased coating, and thus roll, thickness. Moreover, as shown in FIG. 23, by controlling the number of rolls 64 produced in one operation cycle, rolls with different diameters can be achieved.

Figure 24:
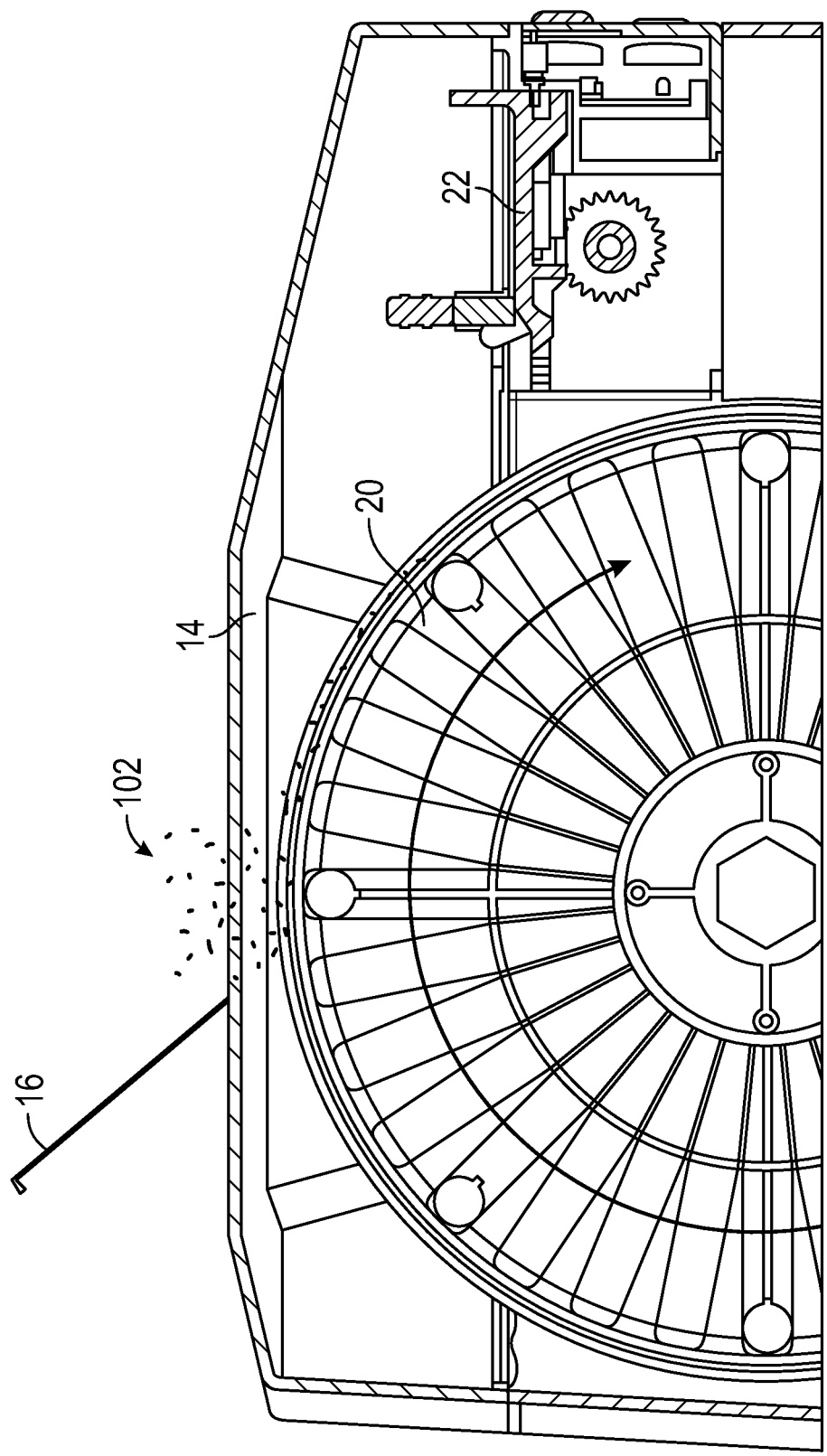
FIG. 24 is an enlarged, cross-sectional illustration of the cover of the ice cream maker of FIG. 1, shown the additional of ice cream toppings.

As shown in FIG. 24, during operation, the access door 16 in the lid 14 may be opened, allowing a user to add various toppings 102 to the frozen coating layers on the freezer wheel 20. In yet other embodiments, toppings can be added directly to the roll serving container 24.

Figures 25, 26:
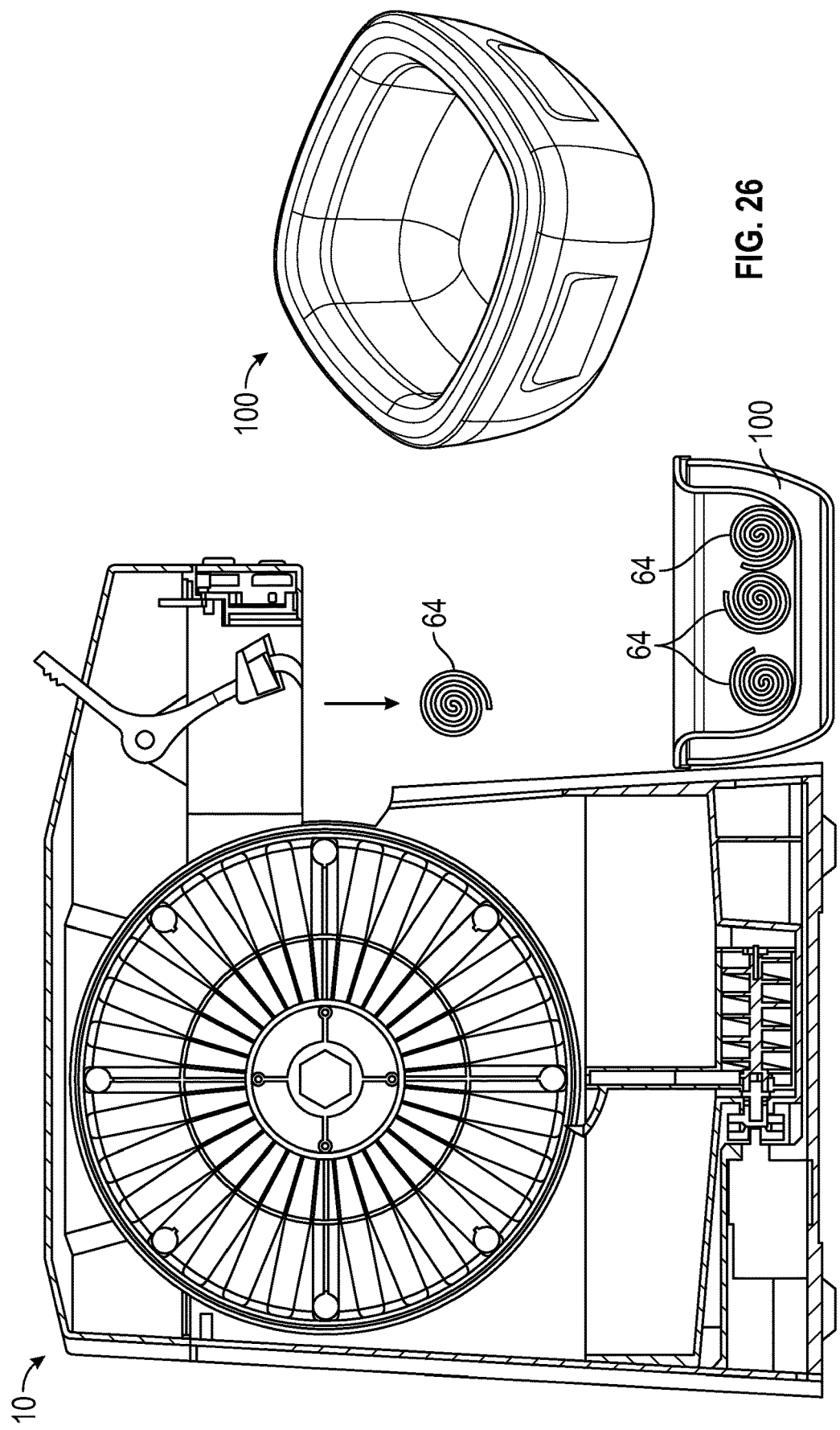
FIG. 25 is a cross-sectional illustration of the ice cream maker of FIG. 1, shown in use with a freezer bowl.
FIG. 26 is a perspective view of a freezer bowl that can be utilized with the ice cream maker of the present invention.

As shown in FIGS. 25 and 26, in an embodiment, the ice cream roll maker 10 may be utilized in conjunction with a freezing bowl 100. The freezing bowl 100 may be a double-walled container defining a hollow wall that receives a freezable or chillable liquid or gel such as, for example, water, salt water, or other coolant. The bowl 100 may be utilized as a temporary container or as a serving bowl.

Figure 27:
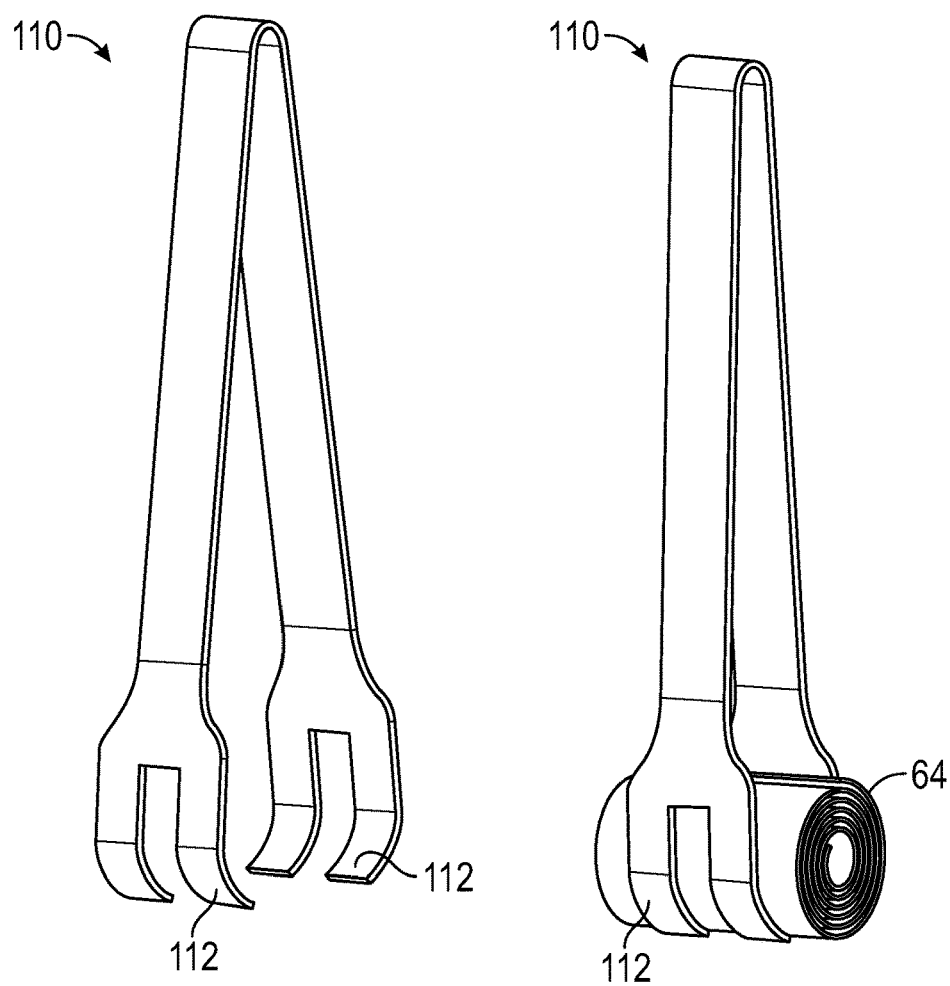
FIGS. 27 and 28 illustrate various ice cream roll serving implements, according to an embodiment of the present invention.

In addition, as shown in FIGS. 27 and 28, various serving devices are contemplated which can be used to serve the ice cream rolls 64 produced by the ice cream maker 10. For example, FIG. 27 illustrates serving tongs 110 having tines 112 that are shaped to correspond to the outer surface of the rolls 64. This prevents damage to the rolls 64 during serving. FIG. 28 illustrates a serving fork 120 having a handle 22 and tines 124 that are configured to be inserted into the central aperture of a roll 64 for serving. In addition, at least one edge of the tines 124 may be formed into a blade or knife 126 for cutting the rolls 64.

Figure 30:
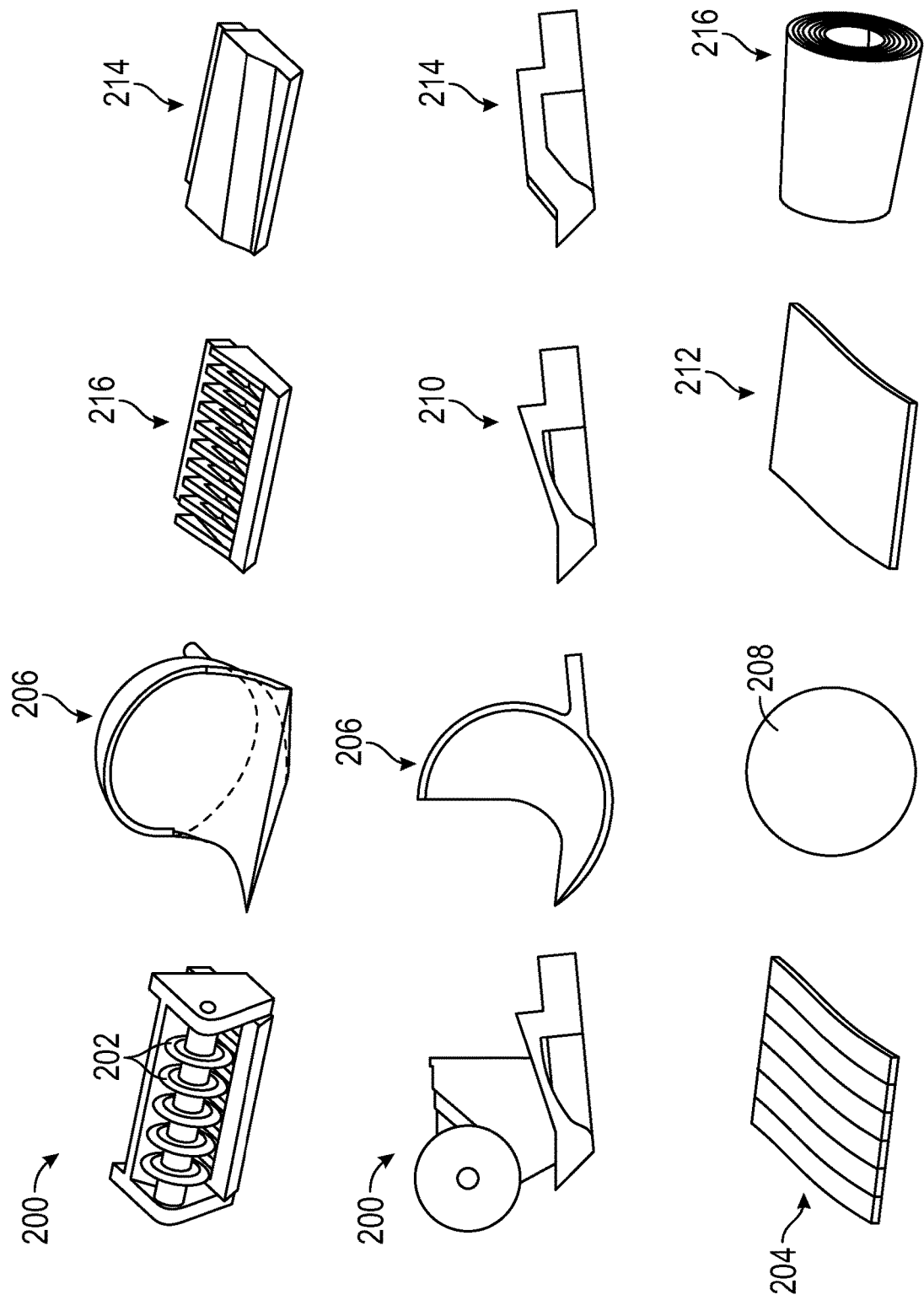
FIG. 30 illustrates various other ice cream forming implements, according to other embodiments of the invention.

While the embodiments described above illustrate the use of a shovel 22 for producing rolls 64, it is also contemplated that the shovel may be interchangeable so that various other shovels for forming ice cream products of various shapes can be used. For example, as shown in FIG. 30, a shovel 200 having blades 202 can be utilized to produce ice cream noodles or strips 204. In addition, a rounded shovel 206 can be used to make balls 208 of ice cream. Moreover, a wedge-shaped shovel 210 can be used to make flat sheets 212 of ice cream, while a tapered shovel 214 can be used to make conical rolls 216 of ice cream.

Figure 31:
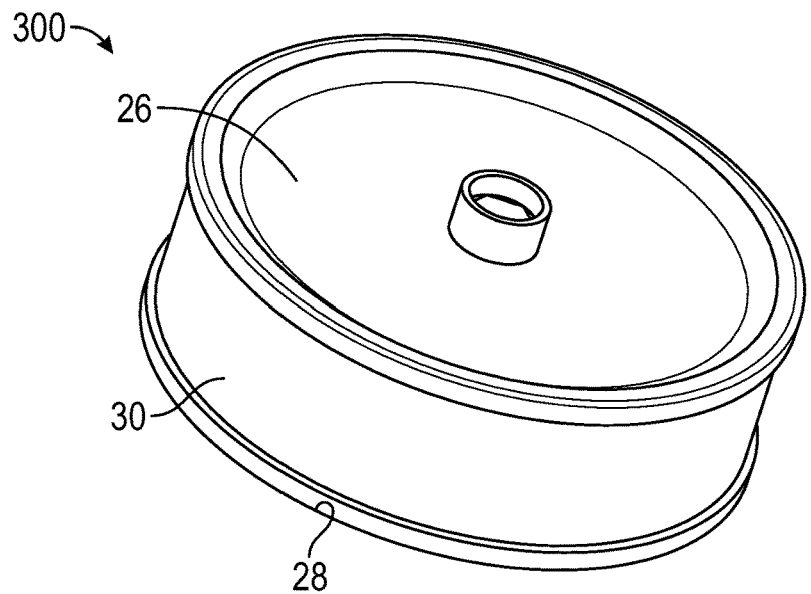
FIGS. 31-33 illustrate various view of an alternative freezer wheel, according to another embodiment of the invention.
Figure 32:
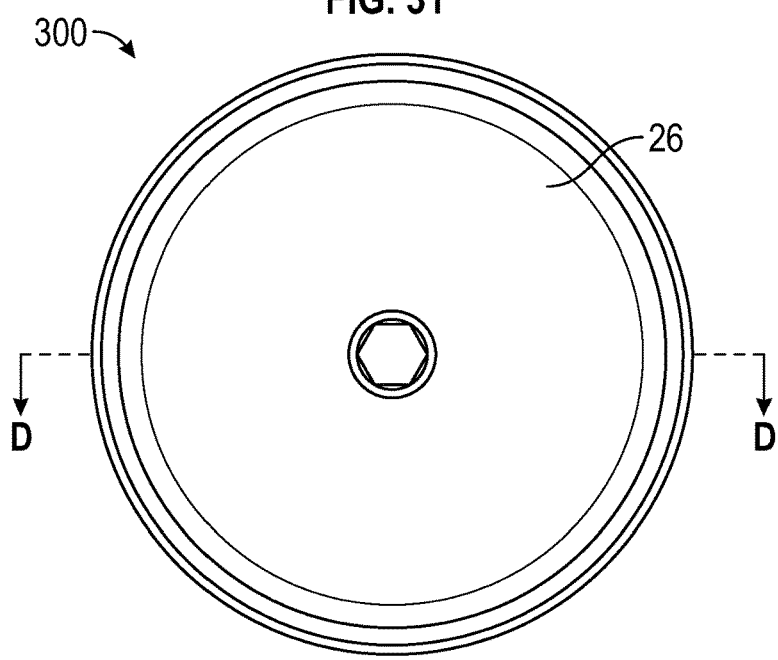
Figure 33:
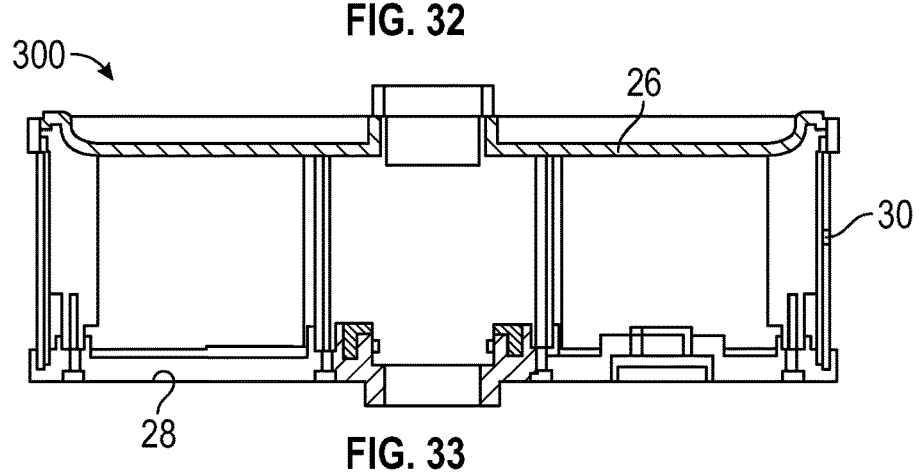

FIGS. 31-33 illustrate an alternative configuration for a freezer wheel 300, for use in a manual ice cream making process. For example, as shown therein freezer wheel 300 is generally similar in configuration to freezer wheel 20, except that freezer wheel 300 has a recessed cover 26 on one side thereof defining a bowl for receiving a liquid ice cream mixture. The recessed cover 26 is a cooled by the heat transfer fins and coolant within the wheel 300. Therefore, when the freezer wheel 300 is not installed in the ice cream maker 10, a liquid ice cream mixture can be poured into the bowl and manually stirred to produce ice cream.

While the embodiments described above discuss the making of ice cream and, in particular, ice cream rolls, the device 10 of the present invention may also be utilized to make other frozen desserts such as sorbet, gelato frozen yogurt and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An ice cream roll maker, comprising:
a housing;
a freezer wheel mounted within said housing and configured for rotation about a horizontal axis;
a reservoir within said housing for holding a liquid ingredient;
wherein an outer peripheral surface of said freezer wheel is configured to receive said liquid ingredient from said reservoir and transform said liquid ingredient into a frozen coating layer on said outer peripheral surface; and
a scraping device forming said frozen coating layer into an ice cream roll before removing said roll from said freezer wheel.

2. The ice cream roll maker of claim 1, wherein:
said scraping device having a leading edge and being movable between a first position in which said leading edge is spaced from said outer peripheral surface of said freezer wheel, and a second position in which said leading edge is adjacent to said outer peripheral surface of said freezer wheel for scraping said frozen coating layer from said outer peripheral surface and for forming said frozen coating layer into said roll upon rotation of said freezer wheel.

3. The ice cream roll maker of claim 2, wherein:
said scraping device includes a plurality of slicing blades oriented perpendicular to said leading edge for creating strips from said roll.

4. The ice cream maker of claim 2, further comprising:
a pump configured to pump said liquid ingredient to a coating device positioned in association with said outer peripheral surface of said reservoir.

5. The ice cream roll maker of claim 4, further comprising:
a motor configured to rotate said freezer wheel about said horizontal axis.

6. The ice roll cream maker of claim 1, further comprising:
a cover engageable with said housing and enclosing said freezer wheel, said cover having an access window for adding a topping to said frozen coating layer.

7. The ice roll cream maker of claim 1, wherein:
said freezer wheel is removable from said housing.

8. The ice cream roll maker of claim 7, wherein:
said freezer wheel contains a coolant and includes a plurality of heat transfer fins in thermal communication with said coolant and said outer peripheral surface.

9. The ice cream roll maker of claim 5, further comprising:
a temperature sensor configured to detect a temperature of said outer peripheral surface; and
a controller communicatively coupled to said temperature sensor, said pump and said motor;
wherein said controller is configured to control a speed of said pump and a rotational speed of said freezer wheel in dependence upon said temperature of said outer peripheral surface of said freezer wheel.

10. An ice cream appliance, comprising:
a housing;
a freezer wheel mounted within said housing and configured for rotation about a horizontal axis, said freezer wheel defining an outer peripheral surface;
a reservoir within said housing for holding a liquid ingredient, said reservoir selectively directing a measured amount of said liquid ingredient to said outer peripheral surface; and
a scraping arm disposed adjacent said outer peripheral surface, said scraping arm selectively communicating with said outer peripheral surface to scrape said outer peripheral surface after said liquid ingredient has frozen thereon.

11. The ice cream appliance according to claim 10, wherein:
said scraper arm causes said frozen liquid ingredient to form into rolls after scraping said liquid ingredient from said outer peripheral surface.

* * * * *